US011377760B2

(12) United States Patent
Papetti et al.

(10) Patent No.: US 11,377,760 B2
(45) Date of Patent: Jul. 5, 2022

(54) HIGH PRODUCTIVITY AND FLEXIBILITY PLANT OF THE SPUN BONDING TYPE FOR THE PRODUCTION OF A NON-WOVEN WEB

(71) Applicant: SOFT N.W. S.p.A., Cerreto Castello (IT)

(72) Inventors: Ivan Papetti, Albino (IT); Marco Rovellini, Piacenza (IT); Daniele Sanella, Fidenza (IT); Stefano Briga, Biella (IT); Olmo Falco, Biella (IT); Paolo Falco, Cossato (IT); Giovanni Verzoletto, Quaregna Cerreto (IT)

(73) Assignee: SOFT N.W. S.P.A., Cerreto Castello (IT)

(*) Notice: Subject to any disclaimer, the term of this patent is extended or adjusted under 35 U.S.C. 154(b) by 0 days.

(21) Appl. No.: 17/418,204

(22) PCT Filed: Dec. 29, 2019

(86) PCT No.: PCT/IT2019/050281
§ 371 (c)(1),
(2) Date: Jun. 24, 2021

(87) PCT Pub. No.: WO2020/141566
PCT Pub. Date: Jul. 9, 2020

(65) Prior Publication Data
US 2022/0042209 A1    Feb. 10, 2022

(30) Foreign Application Priority Data
Dec. 31, 2018  (IT) .................. 102018000021523

(51) Int. Cl.
*D01D 4/02* (2006.01)
*D01D 4/06* (2006.01)
(Continued)

(52) U.S. Cl.
CPC .......... *D01D 13/00* (2013.01); *B29C 66/7294* (2013.01); *B29C 66/84121* (2013.01);
(Continued)

(58) Field of Classification Search
CPC .......... B29C 66/7294; B29C 66/84121; D01D 4/02; D01D 4/06; D01D 4/08; D01D 5/08;
(Continued)

(56) References Cited

U.S. PATENT DOCUMENTS 3,632,265 A * 1/1972 Upmeier ............... B29C 48/03
425/326.1
4,999,080 A    3/1991 Boich
2015/0152571 A1  6/2015 Otani et al.

FOREIGN PATENT DOCUMENTS

EP    0343331 B1   10/1994
ES    2268959 A1   3/2007
(Continued)

OTHER PUBLICATIONS

International Search Report for International Application No. PCT/IT2019/050281 filed on Dec. 26, 2019 on behalf of SOFT N.W. S.P.A. dated Apr. 7, 2020 3 pages.
(Continued)

*Primary Examiner* — Leo B Tentoni
(74) *Attorney, Agent, or Firm* — Steinfl + Bruno LLP

(57) ABSTRACT

An innovative plant (10) for the production with the "spun bonding" technology or similar of a web (V) of non-woven fabric, comprising: a melting station (11) suitable for receiving and melting a polymeric base material (MR), an extrusion bar or head (12) with a plurality of extrusion or drawing nozzles (12*a*) adapted to receive from the melting station (11) the polymeric material (MR) in the molten state to produce a plurality or bundle of continuous filaments (FF);
(Continued)

a conveyor belt (13) adapted to advance along a direction of advancement (A) and to receive from the above the continuous filaments (F), produced by the extrusion nozzles (12a), so as to form a web (V) of non-woven fabric; and consolidation means (14) designed to consolidate the non-woven web (V) formed on the conveyor belt (13); wherein the plant (10) is characterized by a special structure (20) comprising a base platform (21), rotatable (f, f', f") around a respective vertical rotation axis (X), and wherein the melting station (11), suitable for receiving and melting the base polymeric material (MR), and the extrusion bar (12), suitable for receiving from the melting station (11) the polymeric material (MR) in the molten state, are totally built and solidly supported by this rotatable base platform (21) (f, f, f), so as to be rigidly connected to each other without the interposition of any rotating joint. Advantageously, the plant (10) allows to vary, without interrupting its operation, the width (L, L', L") of the non-woven web (V) produced by the same plant, by rotating (f, f', f") and adjusting the base platform (21) around the respective vertical rotation axis (X), so as to vary the inclination (a) of the extrusion bar (12) with respect to the direction of advancement (A) the conveyor belt (13).

9 Claims, 18 Drawing Sheets

(51) Int. Cl.
| | | |
|---|---|---|
| *D01D 4/08* | (2006.01) | |
| *D01D 5/088* | (2006.01) | |
| *D01D 5/098* | (2006.01) | |
| *D01D 7/00* | (2006.01) | |
| *D01D 13/02* | (2006.01) | |
| *D04H 3/16* | (2006.01) | |
| *D01D 13/00* | (2006.01) | |
| *D04H 3/02* | (2006.01) | |
| *D04H 3/14* | (2012.01) | |
| *B29C 65/00* | (2006.01) | |

(52) U.S. Cl.
CPC ............ *D01D 5/0985* (2013.01); *D04H 3/02* (2013.01); *D04H 3/14* (2013.01)

(58) Field of Classification Search
CPC ...... D01D 5/088; D01D 5/098; D01D 5/0985; D01D 7/00; D01D 13/00; D01D 13/02; D04H 3/02; D04H 3/16
USPC ........... 264/211.12, 555; 425/72.2, 224, 377, 425/382.2, 463, 464; 156/180, 181, 433, 156/441
See application file for complete search history.

(56) References Cited

FOREIGN PATENT DOCUMENTS

| | | |
|---|---|---|
| JP | H0226976 A | 1/1990 |
| JP | H02104756 A | 4/1990 |
| WO | 2013/180304 A1 | 12/2013 |

OTHER PUBLICATIONS

Written Opinion for International Application No. PCT/IT2019/050281 filed on Dec. 26, 2019 on behalf of SOFT N.W. S.P.A. dated Apr. 7, 2020 4 pages.

* cited by examiner

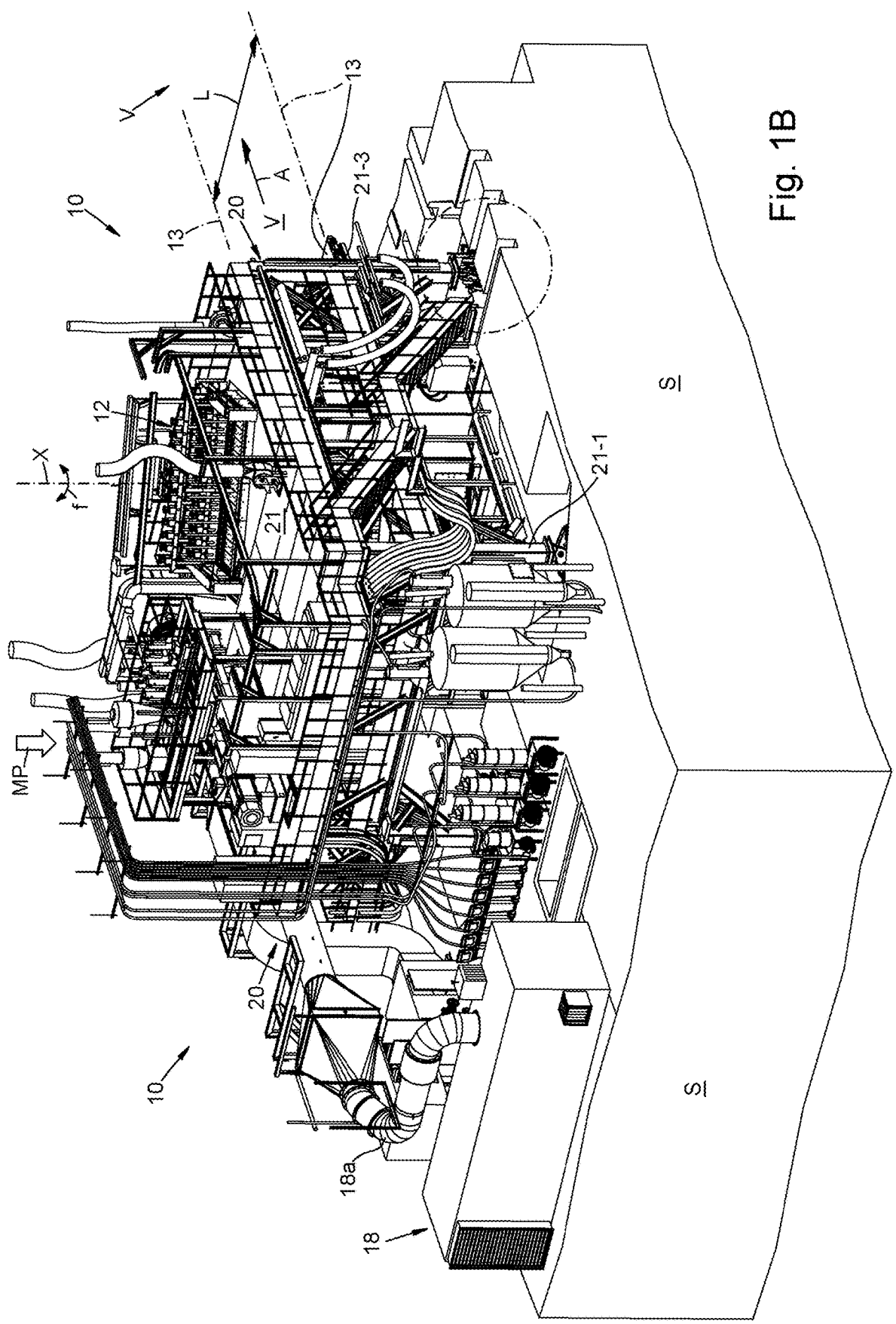

US 11,377,760 B2

HIGH PRODUCTIVITY AND FLEXIBILITY PLANT OF THE SPUN BONDING TYPE FOR THE PRODUCTION OF A NON-WOVEN WEB

CROSS REFERENCE TO RELATED APPLICATIONS

The present application is the US national stage of International Patent Application PCT/IT2019/050281 filed on Dec. 29, 2019 which, in turn, claims priority to Italian Application No. 102018000021523 filed on Dec. 31, 2018.

FIELD OF INVENTION

The present invention relates in general to the field of textile plants and machines and more specifically it relates to a plant or system of the "spun bonding" type or the like for the production of a web of a non-woven fabric.

The invention also relates to a corresponding process for the manufacture, with the "spun bonding" technology or a similar technology, of a web of a non-woven fabric or a non-woven web, and a corresponding textile article of the type of a non-woven web.

BACKGROUND OF THE INVENTION AND STATE OF THE ART

The state of the art provides different technologies and systems to produce a textile article of the type of a web of a non-woven fabric, often simply called "non-woven fabric" or "non-woven web", or also more synthetically "non-woven".

Among these various technologies, one that has encountered a considerable success in the industry, and is still alive and vital and therefore subject to continuous developments and improvements, is the technology commonly called "spun bonding" or "spunbond".

In particular, on the basis of this "spun bonding" technology, the web of non-woven fabric is produced directly in a single manufacturing step, starting from a base material usually consisting of a polymer or resin, normally in the form of granules, which is heated and melted, and then extruded or "spun" in special and appropriate extrusion stations or heads, also called "spinnerets", so as to form a plurality of continuous filaments which are subsequently cooled and spread on a conveyor belt which moves forward continuously, and are subsequently consolidated and held together among themselves in various ways during a final consolidation and "bonding" phase, in particular by the effect of heat and/or pressure, or with the use of adhesive substances or by other systems, so as to form a final web of cohesive and compact non-woven fabric.

This "spun bonding" technology has been implemented in numerous plants, currently operating, which are designed to provide high production of the web of non-woven fabric.

A problem posed by these known and in use plants and systems based on the "spun bonding" technology is that of being even more efficient and productive than those already built and currently in use, so as to meet the constant and pressing needs of the market that require "spun bonding" plants capable of producing the web of non-woven fabric in larger quantities and at increasingly more competitive costs, as well as capable of being more versatile, i.e. suitable to adapt quickly to the continuous change of products and their characteristics, as imposed by the market.

In particular, a very widespread problem in the field of the production and manufacture of webs of non-woven fabric is that of adapting, quickly and with the lowest possible cost, the production plants of the "spun bonding" type to the needs and requirements of the market, which require to frequently vary the width and more generally the dimensional requirements of the webs of non-woven fabric, which are produced, in order to take into account their specific application, which can vary from the field of geotextiles to that of application in agriculture.

In order to try to give an answer as more as possible satisfactory to the above problem, numerous solutions have been developed, many of which are reflected in the documents and in the patent literature.

In particular, among these documents indicative of the prior art, reference is made to U.S. Pat. No. 4,999,080, in the name of the German company Corovin GmbH, and to the corresponding European patent EP 0 343 331 B1, which describe an apparatus for the production of a non-woven fabric, wherein the non-woven fabric is produced from continuous filaments, which are formed by a spinning die or bar, including a plurality of nozzles fed by a composition in the liquid state, and are subjected to an action of suction and draw, by a high-speed gaseous flow, from the same spinning die or bar, so as to form a bundle of continuous filaments.

The continuous filaments, subjected to this suction and draw action, are then deposited and distributed on the surface of a conveyor belt which advances in a determined direction, so as to form the non-woven fabric which is continuously evacuated from the conveyor belt.

In particular, the apparatus has the characteristic that the spinning die or bar together with the device for depositing and distributing the bundle of continuous filaments on the conveyor belt can be rotated in a plane parallel to the conveyor belt which evacuates the non-woven fabric from the apparatus.

Therefore, by varying the inclination of the spinning bar with respect to the direction of advancement of the conveyor belt, it is possible to produce by means of this apparatus various models and configurations of the non-woven fabric, responsive to various dimensional requirements.

However the apparatus for the production of a non-woven fabric, as known from the aforementioned documents U.S. Pat. No. 4,999,080 and EP 0 343 331 B1, is not free from limitations and drawbacks, since it necessarily requires a rotary joint or a device or a similar member for connecting the supply or feeding system of the liquid composition to the spinning die or bar, for the formation of the continuous filaments, which is rotatable in a plane parallel to the conveyor belt, in order to allow the same spinning bar to receive the composition liquid and form the bundle of continuous filaments to be deposited and distributed on the conveyor belt.

In fact this rotary joint might give rise to problems of sealing of the composition or of the material in the liquid state that feeds the spinning bar and therefore of leakages of the same liquid material to the outside, especially if the liquid material for the formation of the continuous filaments is fed to the spinning bar at a high temperature and pressure, as in fact occurs in the industrial practice, in which also temperature values between 180 and 330° C. and pressure of 300 bars can be reached in the hot melt polymeric material fed to the spinning bar or die.

In any case, the presence of this rotary joint or similar connection means between the feeding system of the composition in the liquid state and the rotatable spinning bar or die, which receives the liquid composition to form the continuous filaments, appears to limit and reduce significantly the performance of this known apparatus, although capable and having the advantage of producing various models and configurations of the non-woven fabric thanks to the possibility of rotating the spinning die or bar in a plane parallel to the conveyor belt.

Moreover, because of the high values of pressure and temperature of the fluid material, it is extremely difficult for such a rotary joint, when made with current technologies, to effectively allow the rotation of the spinning bar or die during operation of the apparatus without implying loss of fluid material or mechanical drawbacks.

For completeness of information, there are also mentioned the following patent documents WO 2013/180304 A1, JP 02-104756 A, JP 02-026976 A, which describe equipments and systems for the production of a non-woven fabric, each comprising a spinning bar or die, often indicated with the term "spinneret", in turn including a plurality of nozzles, so as to be able to receive a material in the molten state to produce, by extrusion through the nozzles, a plurality of continuous filaments, which are then appropriately treated and received by a conveyor belt, which moves in a given advancement direction, so as to form the non-woven fabric which is continuously discharged from the conveyor belt, wherein the spinning bar is rotatable and orientable angularly with respect to the direction of advancement of the conveyor belt which evacuates the non-woven fabric.

However, also the solutions proposed by these documents are not free from limitations and problems and generally have the disadvantage of necessarily comprising a rotary joint or similar connection means that are arranged between the system for supplying and feeding the material, in the molten state, of which the continuous filaments are constituted, and the extrusion or spinning bar which receives such molten material to form the same continuous filaments used to produce the non-woven fabric, with all the limitations and problems that this rotating joint implies, as illustrated above, in the performance of the equipments for the production of the non-woven fabric.

Furthermore, in order to provide a complete picture of the known art, a quick reference is also made to the technology usually indicated with the expression "melt blowing" or "meltblown", for the production of a layer or web of non-woven fabric or of similar textile article, which technology presents many and significant similarities with the "spun bonding" technology, previously illustrated.

In particular in this "melt blowing" technology, the continuous filaments, also formed as in the "spun bonding" technology by extrusion or drawing of a material in the liquid state by means of a die including a plurality of nozzles, are subjected to the action of a flow or blast or blow of air or another high-speed fluid, in order to be "melt" intimately with each other due to this "blowing" action, and therefore form and consolidate a non-woven fabric which is deposited on and evacuated by a conveyor belt, instead of being held together and consolidated, so as to form the non-woven fabric, due to the effect of heat and/or pressure, or with the use of bonding substances, like in the "spun bonding" technology.

Finally, there are still cited the following companies which notoriously operate and innovate in the field of both "spun bonding" and "melt blowing" technology for the production of non-woven fabrics, and are owners of numerous patent rights in this field of technology:
Freudenberg (Germany)
Kimberly-Clark (USA)
Nippon Nozzle (Japan)
Du Pont (USA)
Toray Industries (Japan)
Mitsui Chemicals (Japan)
Reiphenauser (Germany)
Faré (Italy)
Freudenberg Politex (Italy, France, USA)
Rieter (Switzerland)
STP Impianti (Italy)
Nordson (USA)
Neumag (Germany)
Asan (USA)
Hills (USA)
Exxon (USA)
FibeRio Technology (USA).

SUMMARY OF THE INVENTION

Therefore a primary object that the present invention aims to achieve is that of proposing and implementing a new and innovative "spun bonding" or similar plant, for the production of a web of non-woven, which offers significantly improved performance with respect to systems and plants of this type, made and in use until today, and which in particular has the capability to adapt quickly, without interruptions in the production, to the demands and needs of the market that frequently require to vary the width and in general the dimensional requirements of the webs of non-woven which are produced.

A further object that the present invention aims to achieve is that of offering a "spun bonding" type plant which allows significant savings and economic advantages, compared to current plants, in the production of a layer or web of non-woven fabric, and therefore puts the manufacturing industry that installs and uses the new plant in a position to be more competitive in the market.

The aforementioned objects can be considered fully achieved by the plant, for the production with spun bonding technology of a web of a non-woven, having the features recited by the first independent main claim.

Particular embodiments of the plant of the invention for the production with the spun bonding technology of a web of non-woven are furthermore defined by the dependent claims.

Advantages of the Invention

As it will appear better and more clearly from the following description, the new plant, according to the present invention, for the production of a non-woven web with spun bonding technology or a similar technology, exhibits a lot of relevant and unique advantages, in part previously announced, among which there are mentioned the following ones, purely as an indication:
  high production flexibility, i.e. a large capacity of the plant to adapt to the dimensional requirements of the webs of non-woven to be produced with the same plant;
  high productivity, thanks to the possibility of changing the height or width and the characteristics of the web of non-woven without necessarily having to stop the plant and therefore interrupt the production of the non-woven web;
  absence of any rotary joint, which would imply sealing problems of the molten polymeric material flowing in the plant, between the melting station of the polymeric material and the extrusion bar receiving the polymeric material in the lo molten state to produce the continuous filaments, thanks to the fact that the melting station and the extrusion bar are both installed integrally on a common angularly adjustable platform;

possibility to rotate the suction box, placed under the conveyor belt which evacuates the web of non-woven from the plant, in order to optimize the depression acting on the non-woven web and therefore also the overall efficiency of the production plant;

limited management and maintenance costs compared with current plants, in particular in consideration of the fact that in the plant of the invention the same spinneret or extrusion head can be used in the production of webs of different widths and dimensional characteristics, whereas very differently in the current plants, in order to produce webs of different widths, it is usually necessary to provide and set up several distinct extrusion dies or heads, to be activated and deactivated selectively at the occurrence, with consequent costs both for the setting-up and maintenance of them;

a significant reduction in production waste;

greater productivity in general and therefore a higher economic profitability of the plant.

These and other objects, features and advantages of the present invention will clearly appear from the following description of a preferred embodiment thereof, given as a non-limiting example, with reference to the attached drawings.

BRIEF DESCRIPTION OF THE DRAWINGS

FIG. 1B is a perspective view, only of lines, which shows in the complex the rear part the plant of the "spun bonding" type, according to the present invention, of FIGS. 1 and 1A;

DESCRIPTION OF A PREFERRED EMBODIMENT OF THE INVENTION

With reference to the drawings, a plant, according to the present invention, for the production with the so-called "spun bonding" technology of a web or layer or veil of a non-woven fabric or non-woven web V, is indicated as a whole with 10.

The plant 10 is installed on a special foundation or base structure, in reinforced concrete, indicated with S, which is preliminarily built in the site where the plant 10 will be operative to produce the web of non-woven fabric V, and on which, during the installation of the same plant 10, the respective fixed parts are rigidly anchored and fixed.

Figure 1:
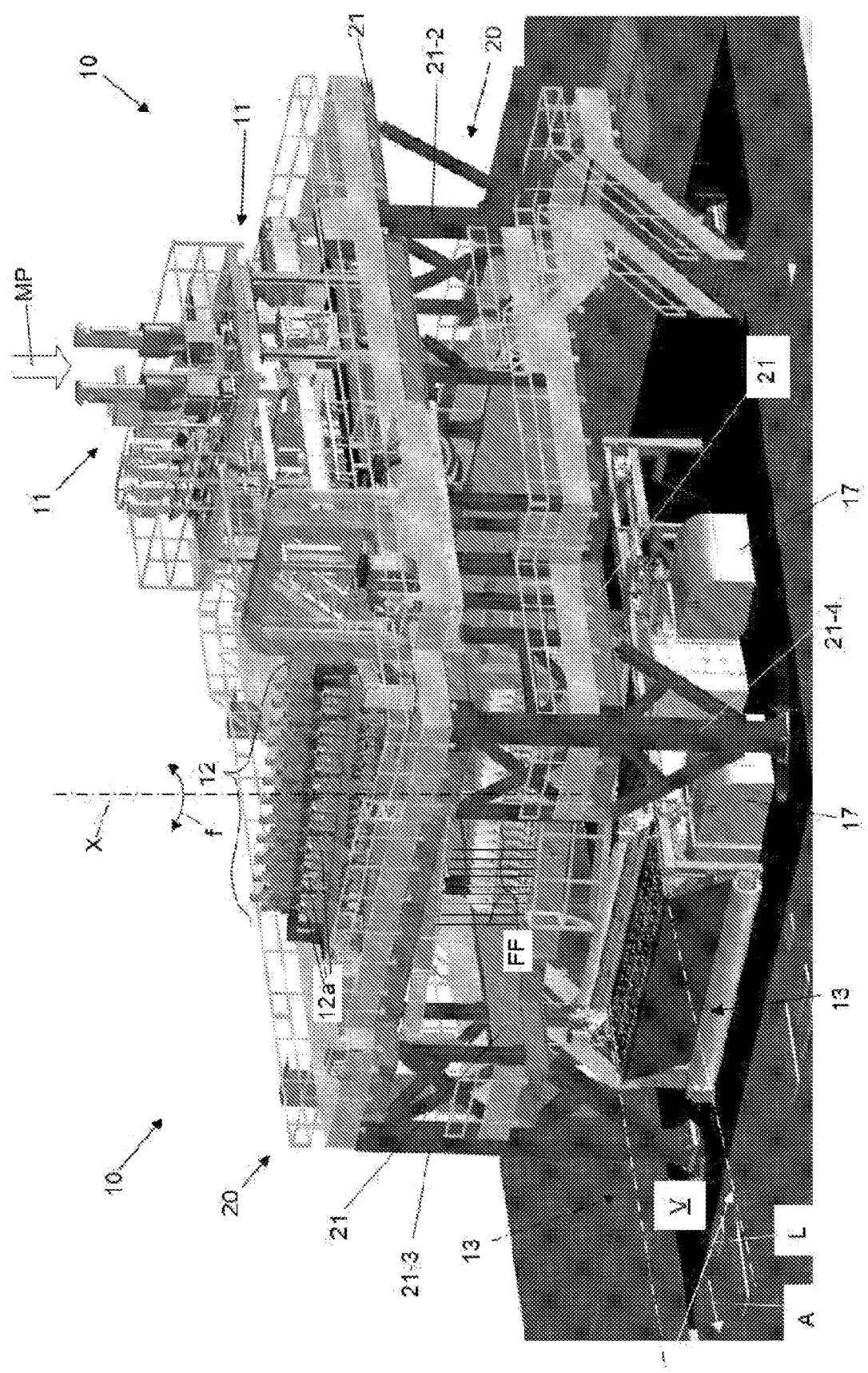
FIG. 1 is a three-dimensional graphical view showing a "spun bonding" type plant, which is in accordance with the present invention and is characterized by a rotatable platform, for the production of a layer or web of a non-woven fabric.
Figure 1A:
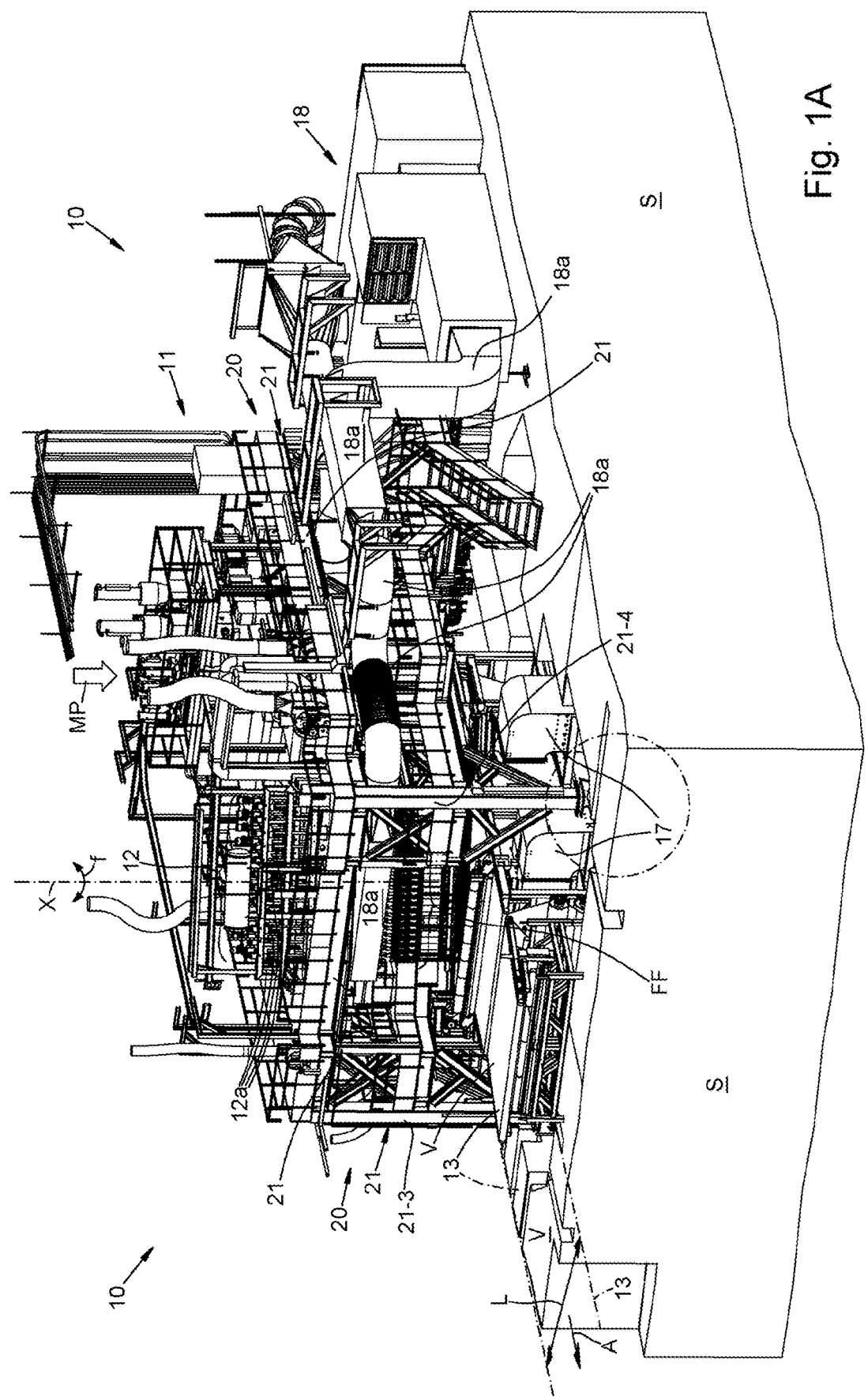
FIG. 1A is a front perspective view, composed only of lines, corresponding to the three-dimensional graphic view of FIG. 1.
Figure 1C:
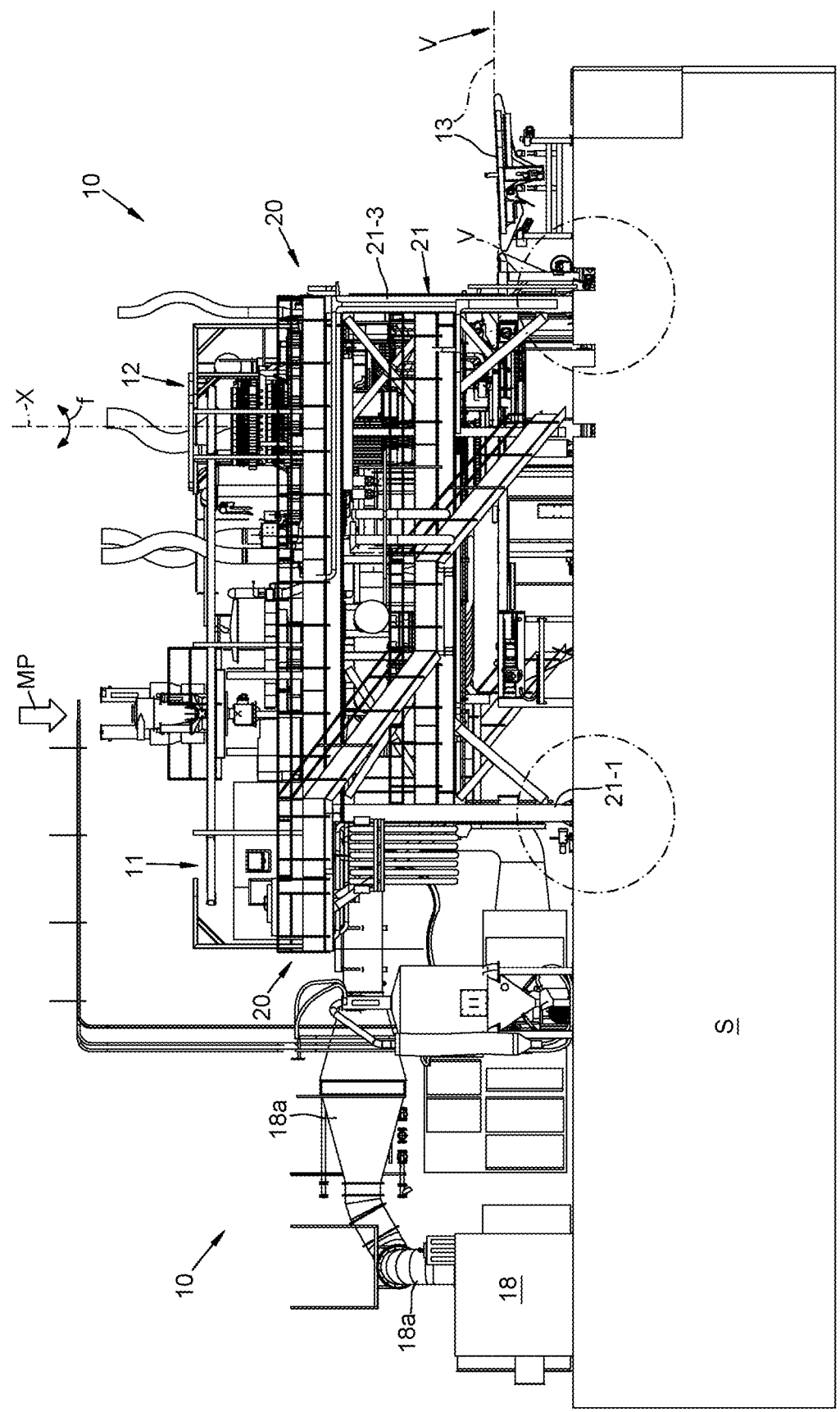
FIG. 1C is a side view, with only lines, of the plant of the invention of FIGS. 1, 1A and 1B.

In detail, the plant 10 of the invention comprises:

a melting station, generally indicated with 11, suitable for receiving and melting a basic polymeric material MP, an extrusion bar or head, indicated as a whole with 12, adapted to receive from the melting station 11 the polymeric material MP in the molten state to produce a plurality or bundle or array of continuous filaments, indicated as a whole with FF in FIG. 1, wherein this extrusion bar 12 in turn comprises a plurality of blocks, indicated with 12a, also called spinning packs and exhibiting a layered configuration, which are suitable for achieving an optimal distribution of the fluid polymeric material MP and are associated with a plate or die defining a plurality of extrusion and spinning nozzles, also indicated with 12a, through which the fluid material MP passes and is extruded to form the continuous filaments FF, a conveyor belt 13 adapted to advance along a given direction of advancement A and to receive from the above the bundle FF of continuous filaments produced by the extrusion nozzles 12a, so as to form, on the surface of the conveyor belt 13, a web V of a non-woven fabric and continuously evacuate it from the plant 10; and consolidation means, generally indicated with 14, suitable for consolidating the non-woven web V formed on the conveyor belt 13.

The parts, described above, of the plant 10 for the production of the non-woven web V, have substantially known characteristics, and for example the consolidation means 14 can be of the type suitable for heating the non-woven web V with air, according to the so-called "air through bonding" technology, or by hot pressing the web, so as to partially melt the filaments together.

Furthermore, these consolidation means can be configured to subject the filaments to a needling treatment or even to supply suitable gluing substances on the non-woven web V, once deposited on the conveyor belt 13, so as to make it assume a stable and cohesive structure between the filaments that constitute the web V of the non-woven fabric.

In the drawings the base polymeric material MP is schematically represented with an arrow and is fed from the outside, in a known way and usually in the form of granulate, powder or flakes to the melting station 11, where the polymeric material MP is heated in so as to melt and assume a fluid state.

In the operation of the plant 10, the extrusion bar 12 receives the polymeric material MP in the molten state from the melting station 11 and continuously produces and extrudes the bundle FF of continuous filaments of polymeric material MP, which therefore, once suitably solidified, while falling from the above, are deposited on the conveyor belt 13 which advances at a given speed of advancement, along the direction A, so as to form on the same conveyor belt 13 the web V of non-woven fabric, shown with dash and dot line in the drawings.

For example, the continuous filaments FF can be solidified, at the exit of the extrusion bar 12, by blowing against them a flow of cooling air, which in turn is generated by suitable means 18, such as a blower 18 associated with a circuit of cooling, and conveyed to the area of the extrusion bar 12 by means of ducts 18a.

Therefore the non-woven web V, while advancing integrally with the conveyor belt 13 so as to be evacuated from the plant 10, is subjected to the action of the consolidation means 14, of known characteristics, so as to assume a cohesive and compact structure, and also trimmed along the edges, still in a known way, so as to present, once produced, a determined width L, corresponding to the required one.

Suitable suction means, generally indicated with 17 and summarized schematically with an arrow in the drawings, of substantially known characteristics and for example in the form of suction boxes, are arranged in an area under the conveyor belt 13, wherein these suction means 17 have the function of sucking air in order to create a flow of air which tends to adhere and therefore stabilize the non-woven web V on the surface of the conveyor belt 13, while it is evacuated from the plant 10 by means of the same conveyor belt 13 which advances along the advancement direction A.

Finally, the non-woven web V is collected at the exit of the plant 10, in the form of rolls R, by means of appropriate collection means, generally indicated with 16, arranged at the exit of the plant 10.

Figure 3:
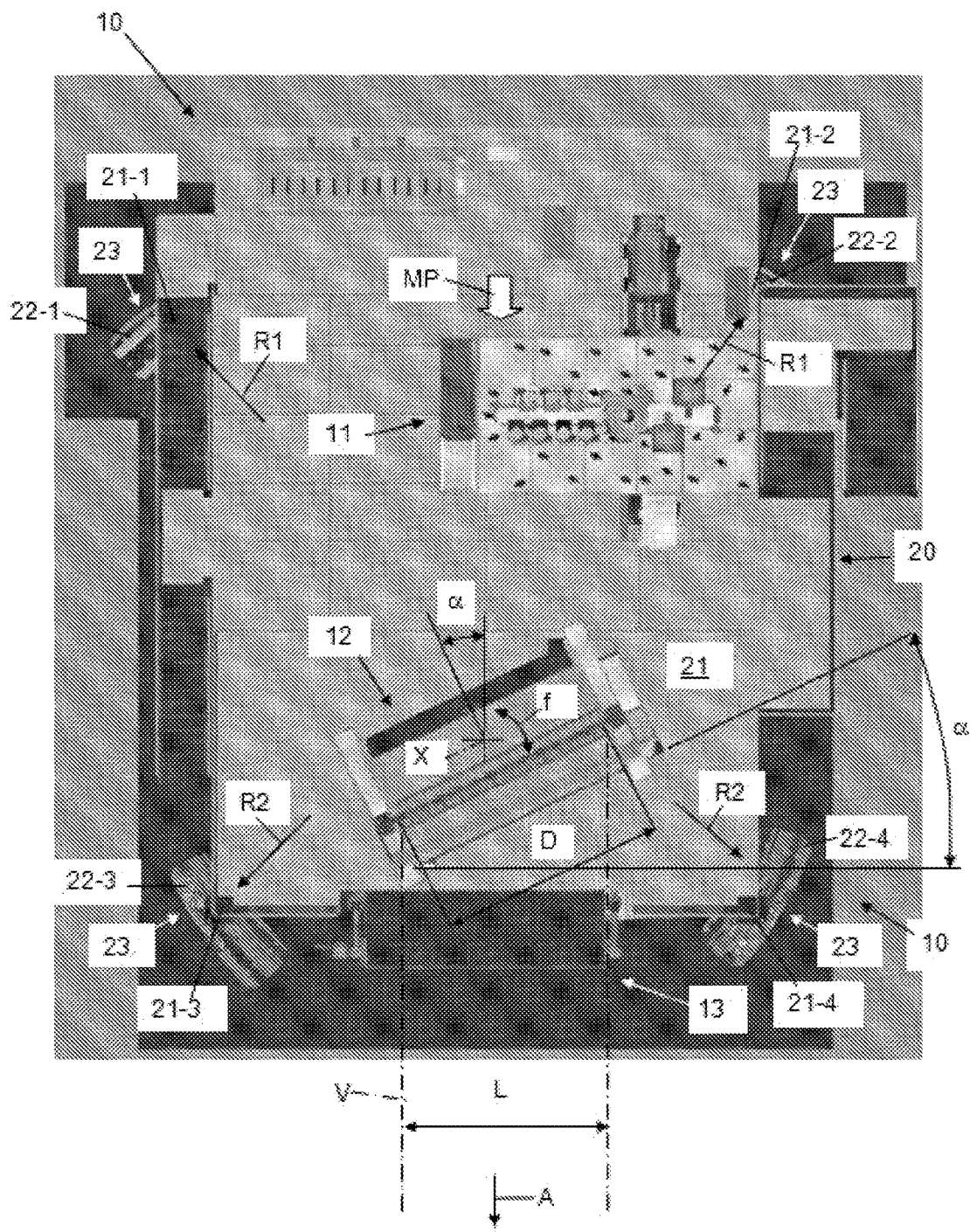
FIG. 3 is a graphic view, in an enlarged scale, showing in plan the plant of FIGS. 2 and 2A in the first non-inclined arrangement.
Figure 3A:
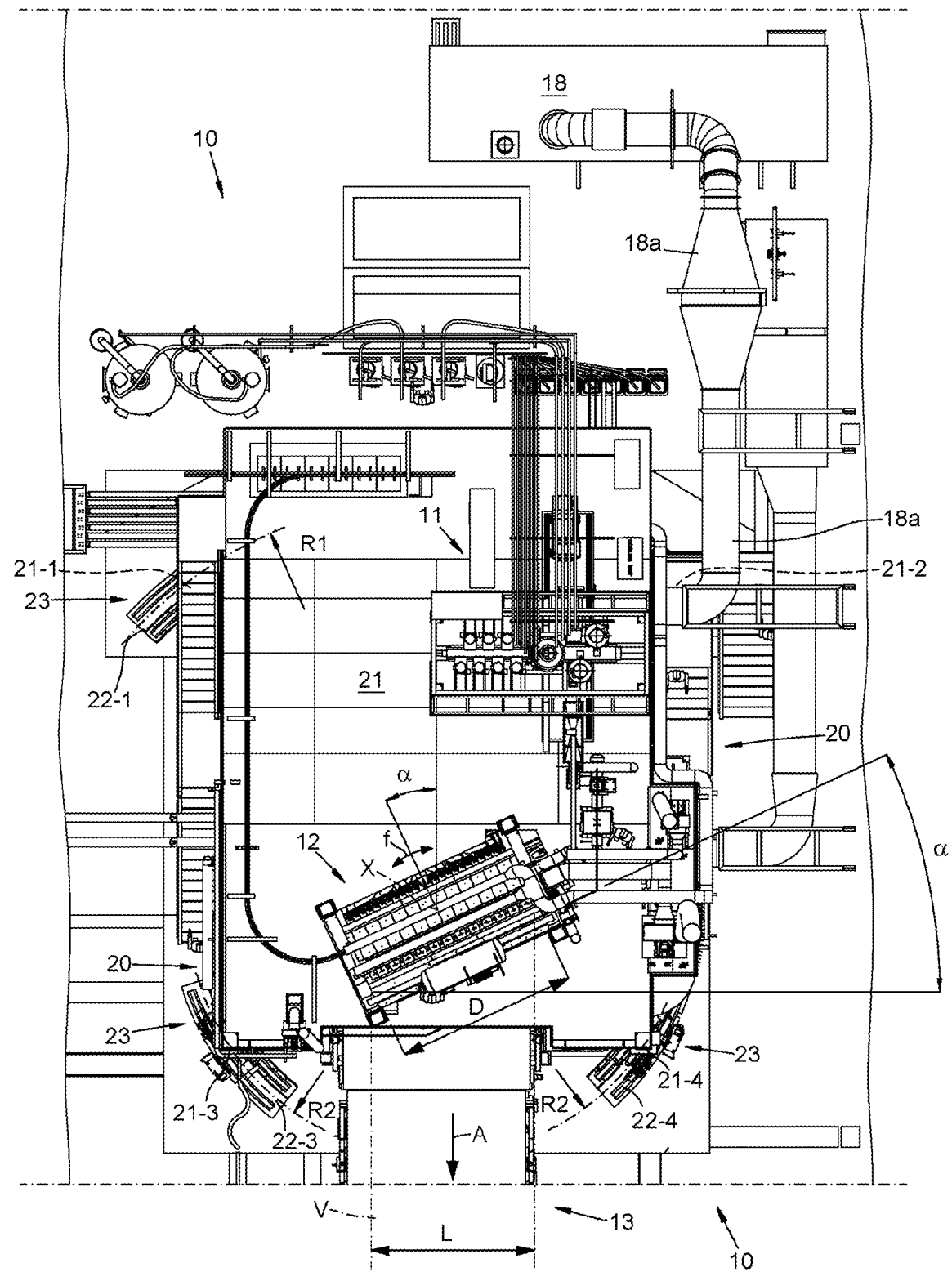
FIG. 3A is a view, only of lines, corresponding to the plan view of FIG. 3.

According to a salient and essential feature of the present invention, the plant 10 for the production with the spun bonding technology of the non-woven web V comprises a special structure, generally indicated with 20, which in turn comprises a base platform 21, rotatable around a respective vertical rotation axis X, as indicated with a double arrow f in FIGS. 1 and 3, wherein both the melting station 11, suitable for receiving and melting the base polymeric material MP, and the extrusion bar 12, in turn comprising the plurality of extrusion or drawing nozzles 12a suitable for receiving from the melting station 11 the polymeric material MP in the molten state, are totally constructed and solidly supported by this rotatable base platform 21, so as to be rigidly connected to each other without the interposition of any rotary joint.

As it can be seen from the drawings, the vertical rotation axis X, around which the base platform 21 is rotatable, extends vertically in a central region, substantially barycentric, of the extrusion bar 12, i.e. the area of the latter having the plurality of nozzles for extruding the bundle of filaments FF.

Therefore, thanks to this special structure 20 of the plant 10 of the invention, characterized by the rotatable base platform 21, the extrusion bar 12 can be variously inclined with respect to the direction of advancement A of the conveyor belt 13, as further described below.

In detail, the base platform 21, also called hereinafter simply platform, which can be rotated around the vertical axis X, has four uprights, respectively 21-1, 21-2, 21-3, 21-4, coupled slidably in the lower part with corresponding fixed guide supports, respectively 22-1, 22-2, 22-3, 22-4, adapted to guide the rotary movement of the platform 21 around the vertical axis X.

For example these fixed guide supports 22-1, 22-2, 22-3, 22-4 can be configured in the form of curved guides, on which the uprights 21-1, 21-2, 21-3, 21-4 rest in the lower part, by means of respective carriages, and are adapted to slide in response to the action of motor means suitable for controlling the rotation of the platform 21.

In particular, as shown in FIG. 3, according to a preferred embodiment designed to give greater stability to the platform 21, the curved guides 22-1, 22-2, 22-3, 22-4 are configured so as to define a first pair of guides, consisting of the curved guides 22-1 and 22-2, each having a first radius of curvature R1, and a second pair of guides, consisting of the curved guides 22-3 and 22-4, each having a second radius of curvature R2, with respect to the vertical axis of rotation X, wherein the first radius of curvature R1 of each curved guide of the first pair of the curved guides 22-1 and 22-2 is greater than the second radius of curvature R2 of each curved guide of the second pair of the curved guides 22-3 and 22-4.

The motor means, generally indicated with 23, which command and control the rotation of the platform 21 around the vertical axis X, in turn can be made in various ways, for example in the form of electric motors associated with the bases of the uprights 21-1, 21-2, 21-3, 21-4 of the platform 21, wherein these electric motors are able to operate in synchronized mode, under the control of suitable control means, to control movement and sliding in one direction or in the other of the bases of the uprights 21-1, 21-2, 21-3, 21-4 along the curved guides 22-1, 22-2, 22-3, 22-4.

Therefore, by rotating and adjusting by means of the motor means 23 the rotating platform 21 around the respective vertical axis of rotation X, so as to vary the inclination, indicated with a in the drawings, of the extrusion bar 12 with respect to the direction of advancement A of the conveyor belt 13, the plant 10 advantageously allows to vary the width L of the non-woven web V produced by the same plant 10.

Figure 8A:
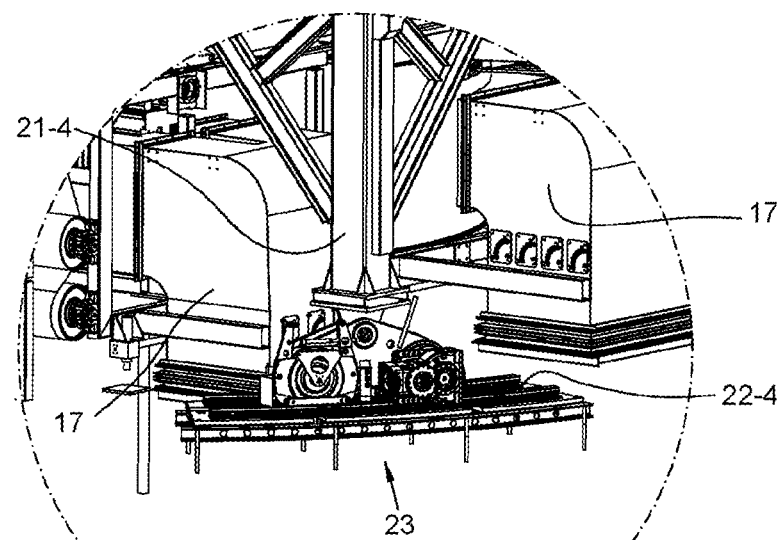
FIGS. 8A, 8B and 8C are views which show in perspective and in an enlarged scale some details of the plant of the invention and in particular the areas, indicated by a dotted circle in FIGS. 1A, 1B and 1C, of the lower supports of the uprights of the rotatable platform that characterizes this plant.
Figure 8B:
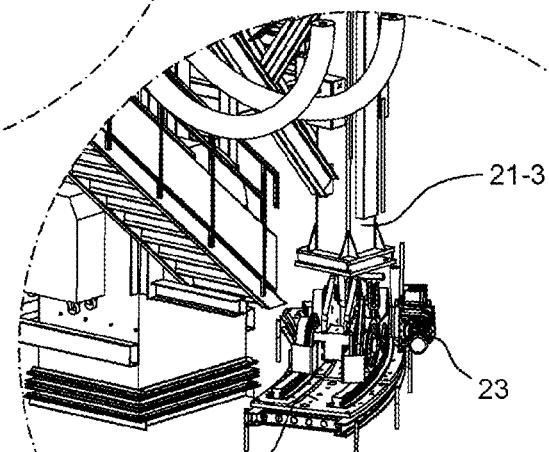
Figure 8C:
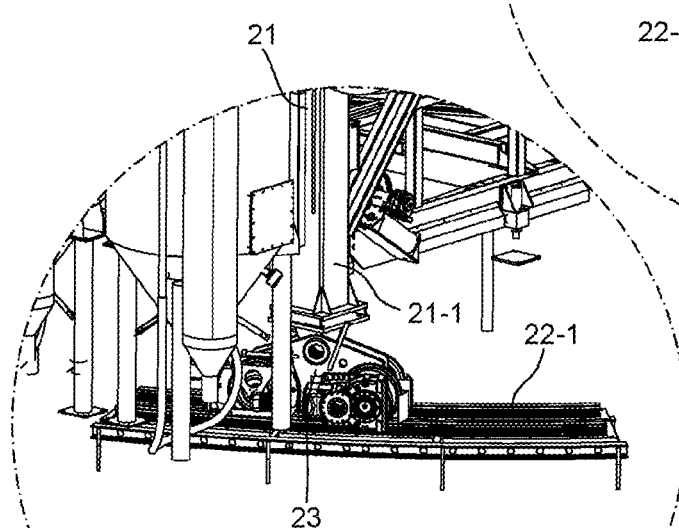

For clarity, FIGS. 8A, 8B and 8C show in perspective and in an enlarged scale the area of the lower supports of the uprights 21-1, 21-2, 21-3, 21-4 of the rotatable platform 21, which characterizes the plant 10, and therefore the motor means 23, in the form of electric motors, able to command and control the movement of the bases of the uprights 21-1, 21-2, 21-3, 21-4 along the curved guides 22-1, 22-2, 22-3, 22-4.

Figure 8D:
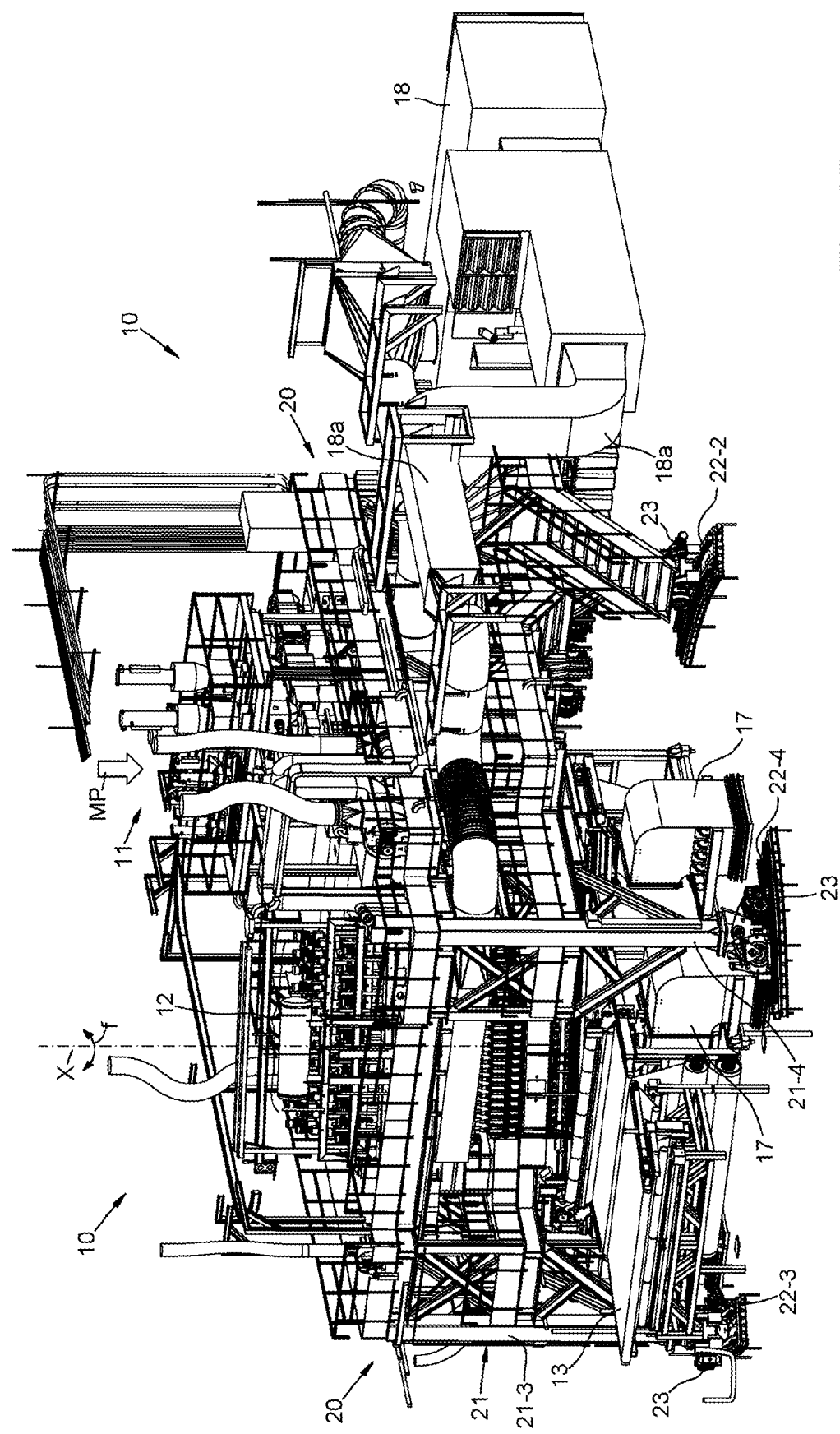
FIG. 8D is a perspective view, with some parts removed, which shows the area of the lower supports of some of the uprights of the rotating platform of the plant of the invention.

In addition, for completeness, FIG. 8D shows the area of some of the lower supports of the four vertical uprights of the rotary platform 21 of the plant 10 of the invention.

As previously pointed out and shown in the drawings, the vertical rotation axis X extends vertically in a geometrically central area of the extrusion area of the FF filaments, as defined by the extrusion bar 12.

Therefore each variation of inclination of the extrusion bar 12, in turn determined by a rotation of the base platform 21, with respect to the direction of advancement A of the conveyor belt 13, implies a corresponding variation of the width L of the non-woven web V, produced by the plant 10, symmetrically along the two opposite edges of the conveyor belt 13, whereby the non-woven web V, even when its width L varies due to a rotation and adjustment of the base platform 21, remains always constantly centered with respect to the conveyor belt 13. while the non-woven web is evacuated from the plant 10.

For completeness, the drawings show some of the possible configurations and structures that can be assumed by the plant 10 of the invention, by rotating the platform 21 around the respective vertical rotation axis X.

Figure 2:
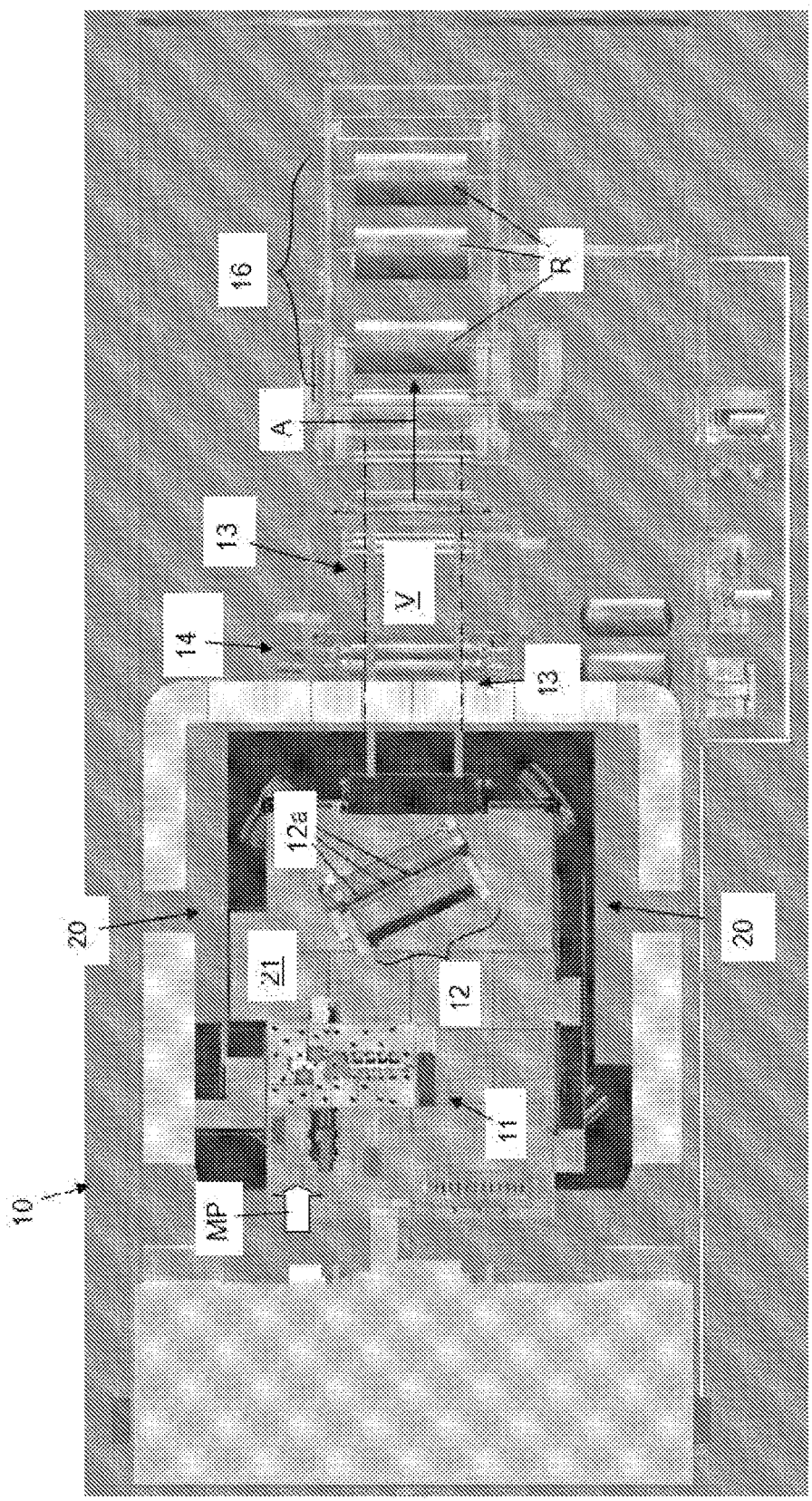
FIG. 2 is a graphical view showing in plan the plant of the invention as a whole, in a first non-inclined arrangement, corresponding to a standard width of the non-woven web produced with the plant.
Figure 2A:
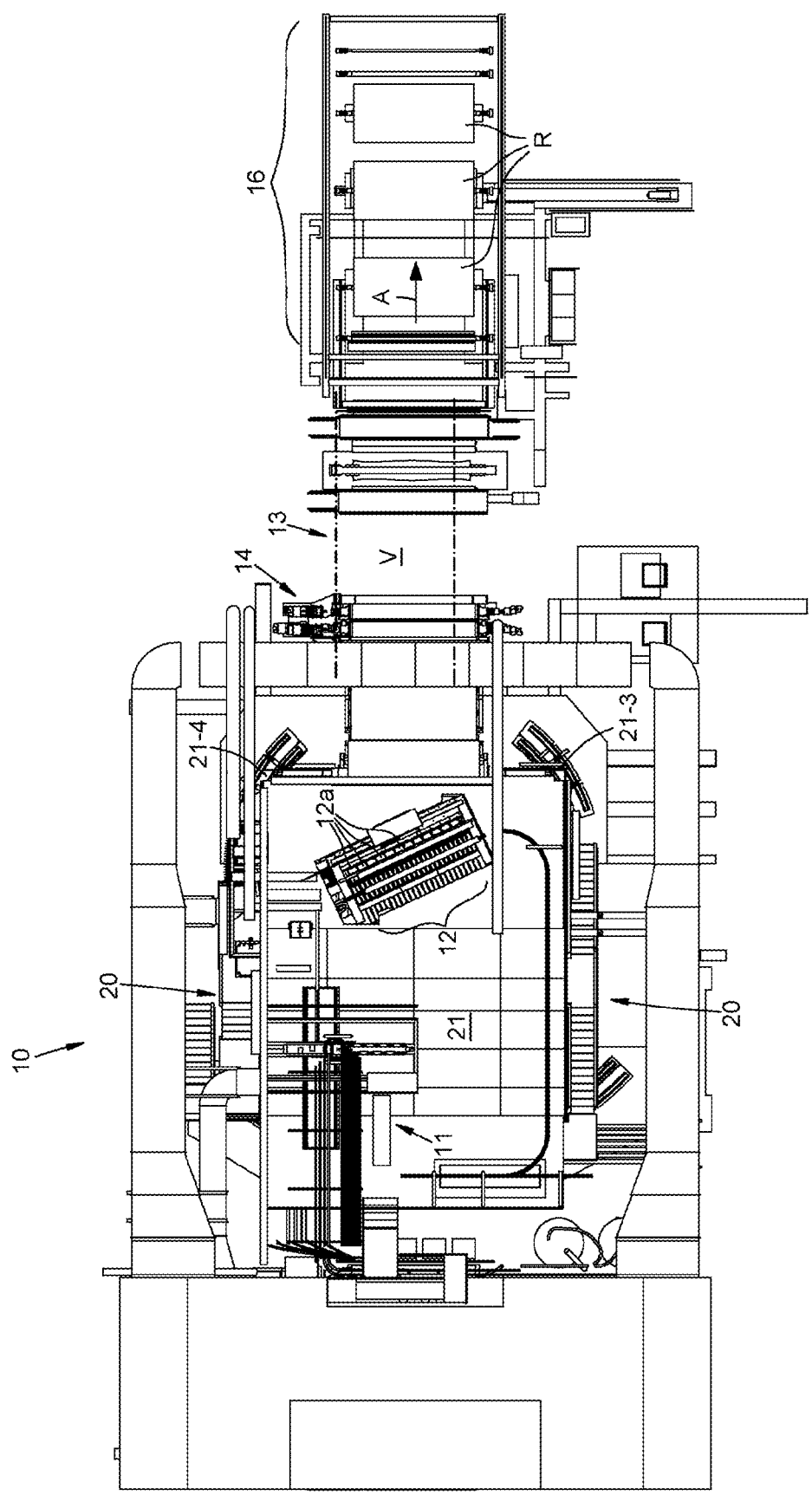
FIG. 2A is a view, only of lines, corresponding to the plan view of FIG. 2.

In particular, FIGS. 2 and 3 show the plant 10 in a standard nominal position not inclined, i.e. with the platform 21 not inclined and therefore aligned with the direction of advancement A of the conveyor belt 13, wherein this structure or standard nominal configuration of the plant 10 corresponds to a standard nominal width L of the non-woven web V produced by the same plant 10.

In this standard non-inclined nominal position of the plant 10, the extrusion bar 12, supported and therefore integral with the base platform 21, is arranged so as to already have a certain inclination a with respect to the direction of advancement A of the conveyor belt 13, whereby, with the plant 10 in this non-inclined standard nominal position, the nominal width L of the non-woven web V produced is indicatively defined by the formula $[D*\cos(\alpha)]$, where D is the extension or transverse width of the extrusion bar 12, as shown in FIG. 3.

For example, in this standard non-inclined nominal position of the plant 10, the extrusion bar 12, supported and therefore integral with the base platform 21, is arranged so as to already have an initial or standard inclination α equal to 25° with respect to the forward or advancement direction A of the conveyor belt 13.

In particular, this standard initial inclination of the base platform 21 can be suitably established so as to optimize the resistance characteristics of the non-woven web V, produced with the plant 10, in the direction of the machine or of the conveyor belt 13, indicated with MD, from "Machine Direction", and in the transverse and orthogonal one, indicated with CD, from "Cross Direction".

In order to increase the resistance characteristics of the non-woven web V in the machine direction MD the extrusion head or bar 12 could also be arranged orthogonally to the direction of advancement of the conveyor belt 13, therefore with an inclination α equal to 0°, or, in order to increase the resistance in the transverse direction CD, up to an inclination of 45°.

The α inclination of 25°, indicated above and adopted by the plant 10 of the invention, was considered an optimal compromise, among the many possible inclinations, between the two extreme inclinations of 0° and 45°.

It should however be noted, as it has been shown by tests carried out, that contained rotations of the extrusion bar 12, such as those proposed and achievable with the plant 10 of the invention, usually do not have a significant influence on the characteristics of the product and in particular imply minimal variations of the resistance ratio MD/RD, i.e. of the ratio between the resistance of the non-woven web V in the machine direction MD and in the transverse direction CD.

Figure 4:
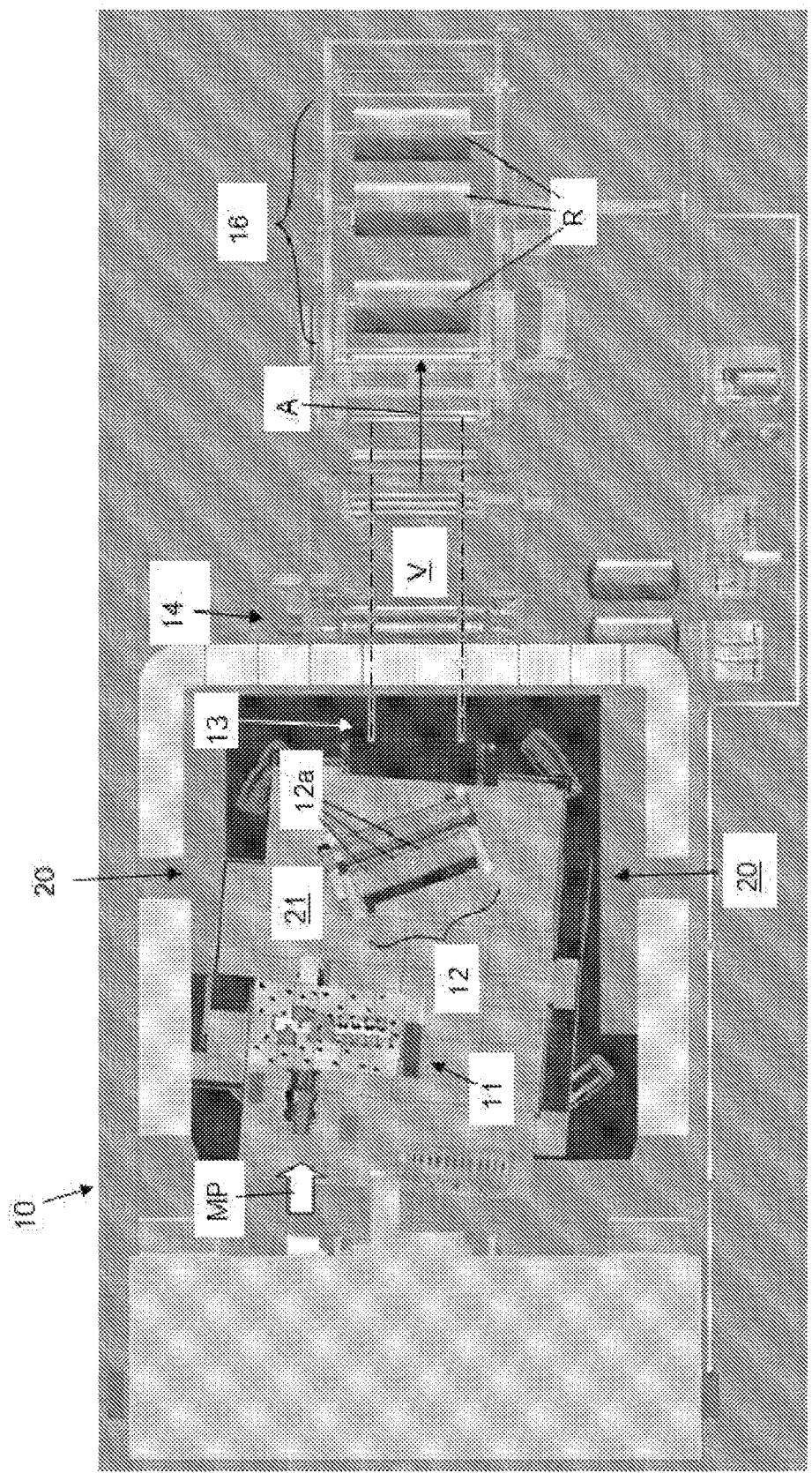
FIG. 4 is a graphical view showing in plan the plant of the invention as a whole, in a second inclined arrangement, corresponding to a maximum width of the web of non-woven fabric produced with the plant.
Figure 4A:
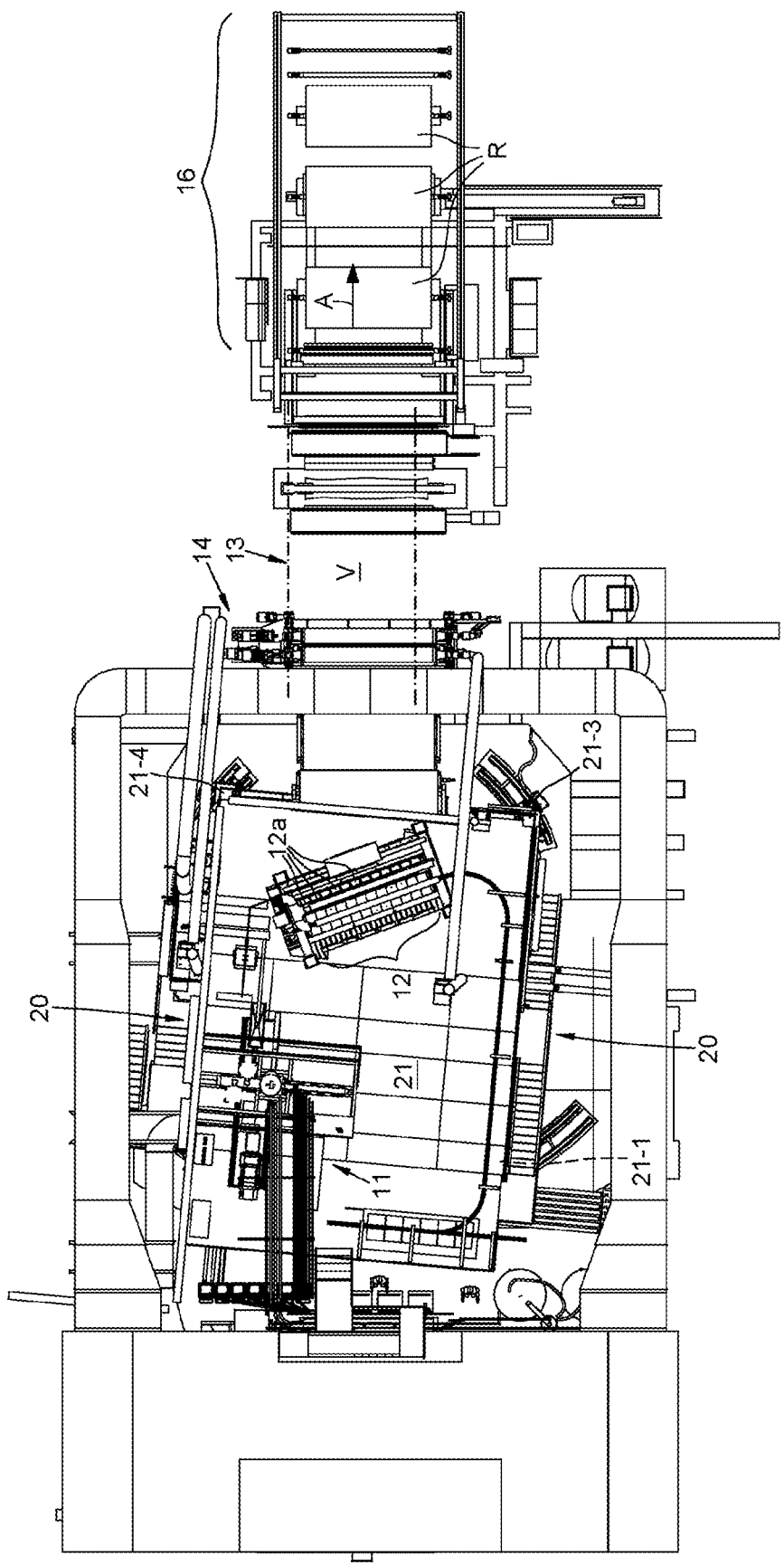
FIG. 4A is a view, only of lines, corresponding to the plan view of FIG. 4.
Figure 5:
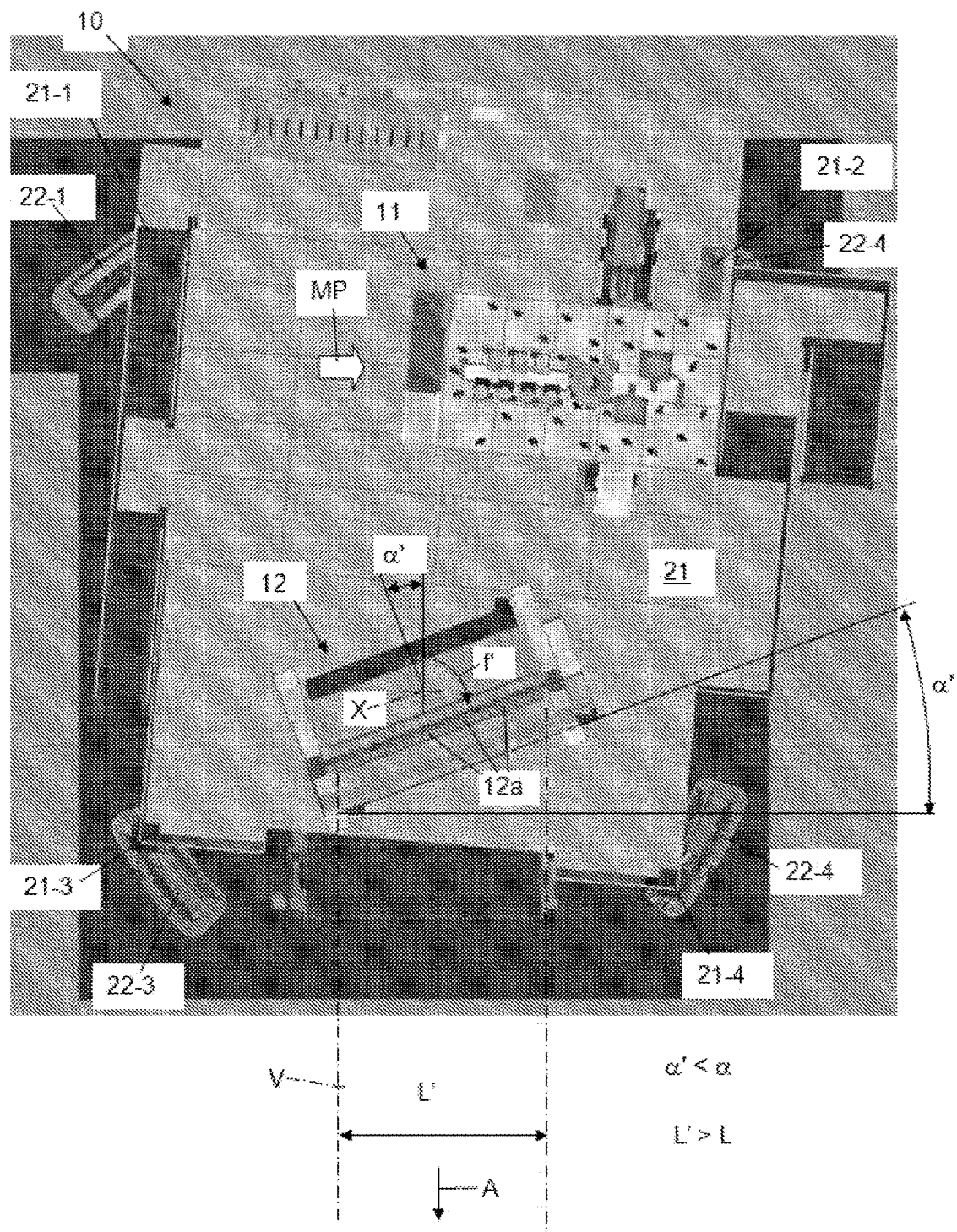
FIG. 5 is a graphic view, in an enlarged scale, showing in plan the plant of FIGS. 4 and 4A in the second inclined arrangement.
Figure 5A:
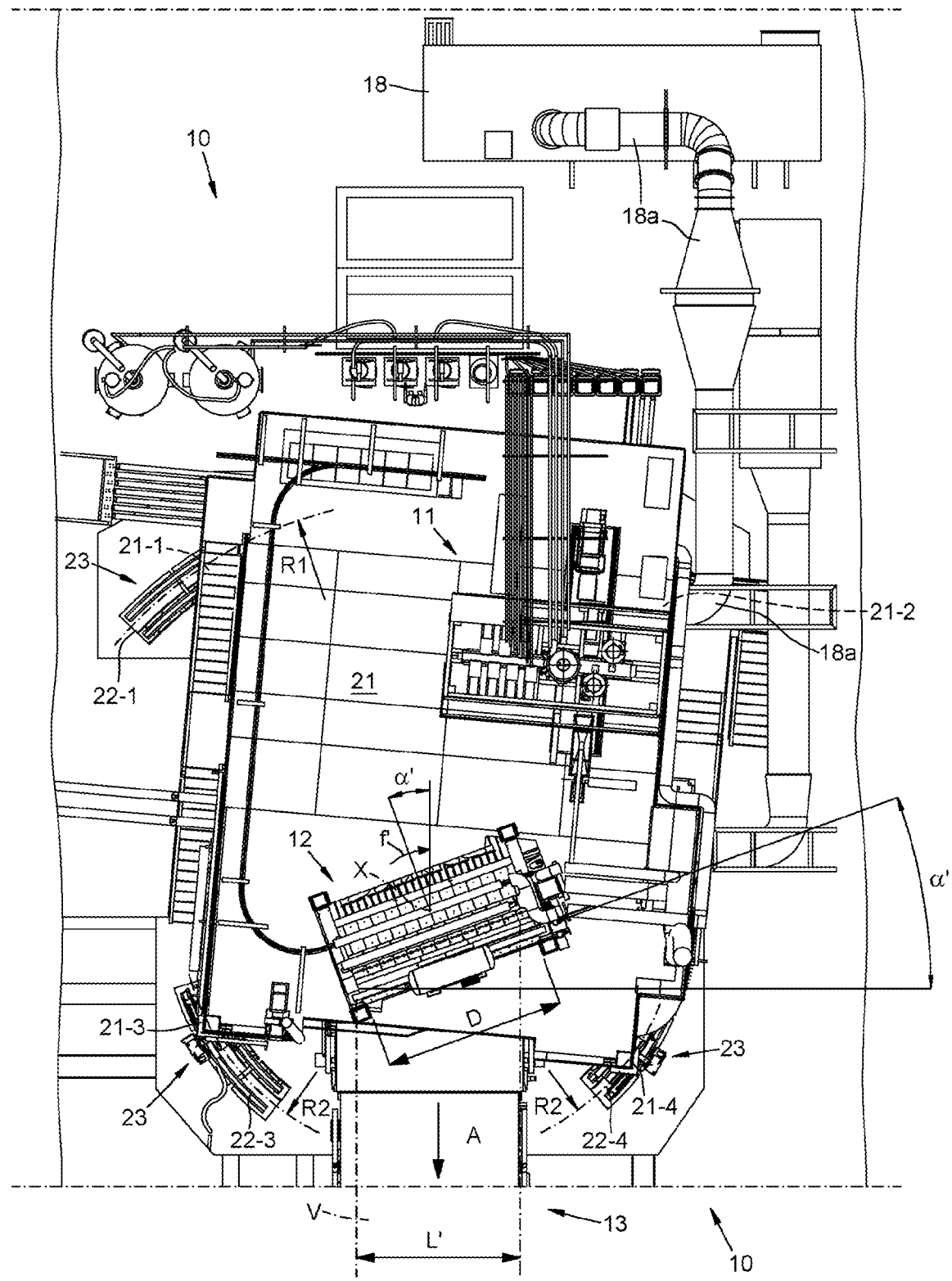
FIG. 5A is a view, only of lines, corresponding to the plan view of FIG. 5.

FIGS. 4 and 5 in turn show the plant 10 in a first inclined position, i.e. with the platform 21 inclined with respect to the standard nominal configuration of FIGS. 2 and 3 and therefore misaligned with respect to the direction of advancement A of the conveyor belt 13, wherein this first inclined position of the plant 10 is obtained, starting from the respective nominal standard configuration, by rotating the base platform 21 clockwise around the respective vertical rotation axis X, as indicated by an arrow f' in FIG. 5.

For example, in this first inclined arrangement, the extrusion bar 12, integral with the base platform 21, is already inclined at an angle α of 20° with respect to the direction of advancement A of the conveyor belt 13, so that this first inclined arrangement, which corresponds to a maximum width L' of the non-woven web V produced by the plant 10, is obtained by rotating the base platform 21 clockwise around the vertical rotation axis X, starting from the respective standard nominal configuration.

Figure 6:
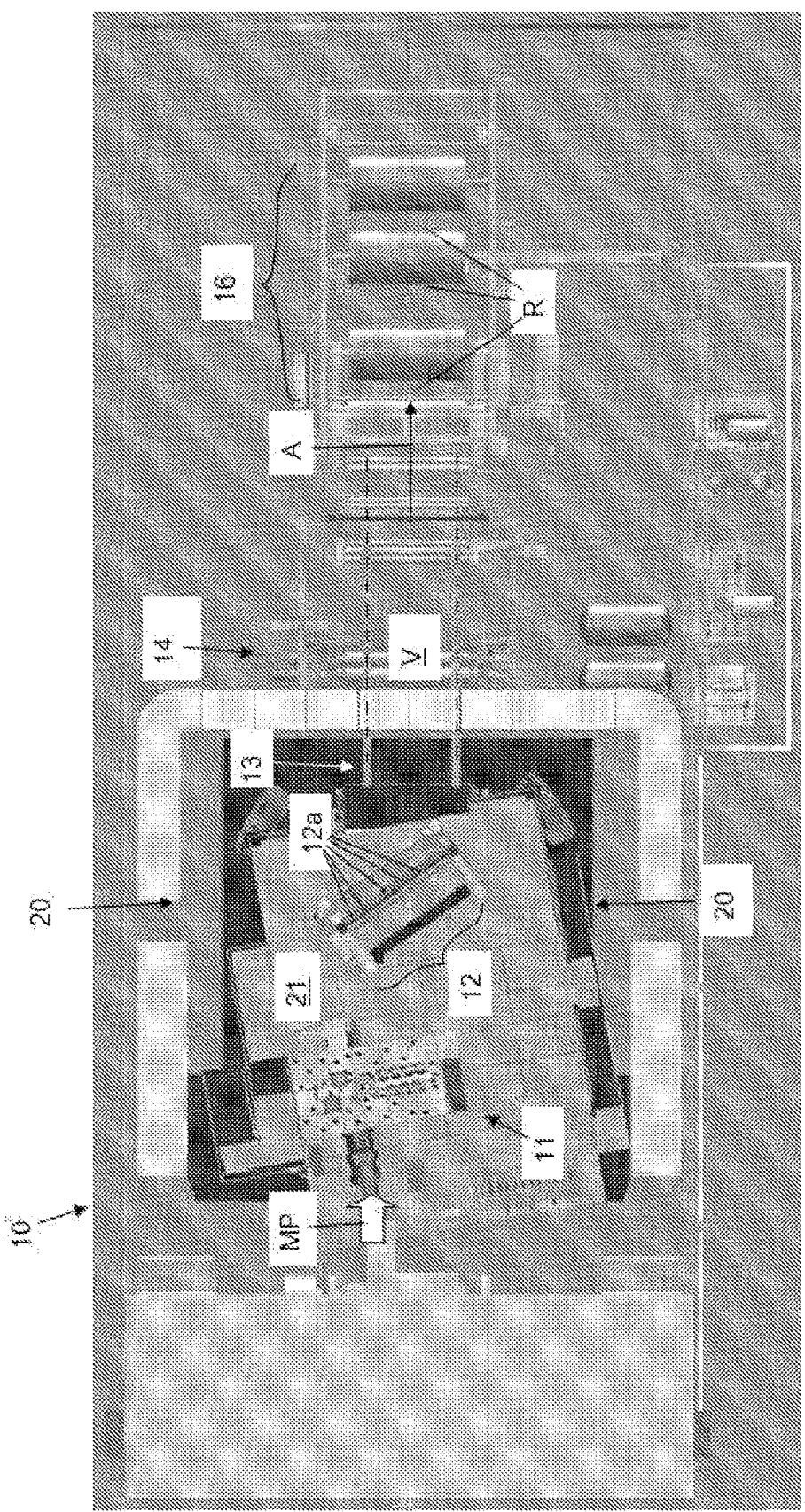
FIG. 6 is a graphic view showing in plan the plant of the invention, as a whole, in a third inclined arrangement, corresponding to a minimum width of the web of non-woven fabric produced with the plant.
Figure 6A:
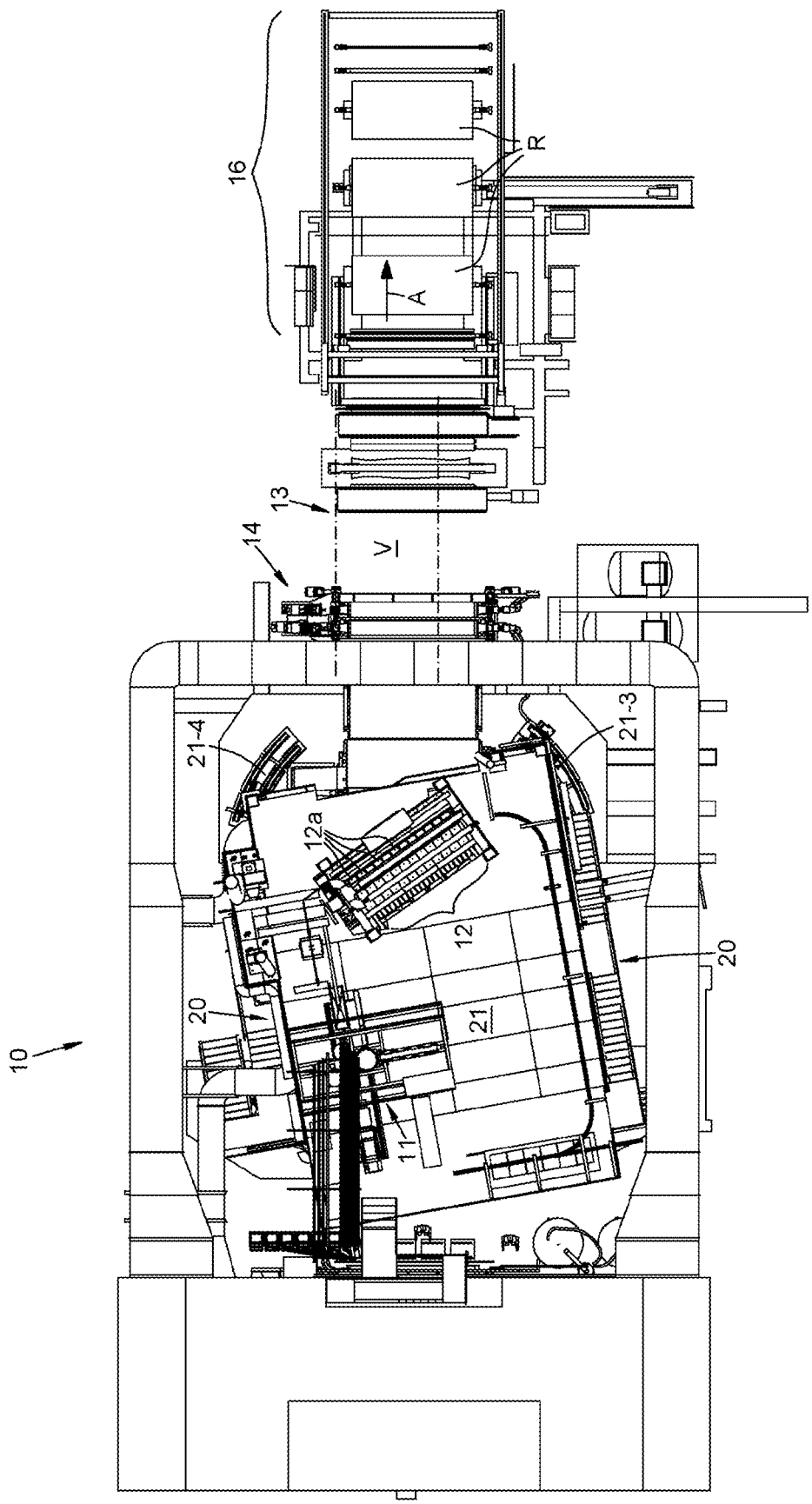
FIG. 6A is a view, only of lines, corresponding to the plan view of FIG. 6.
Figure 7:
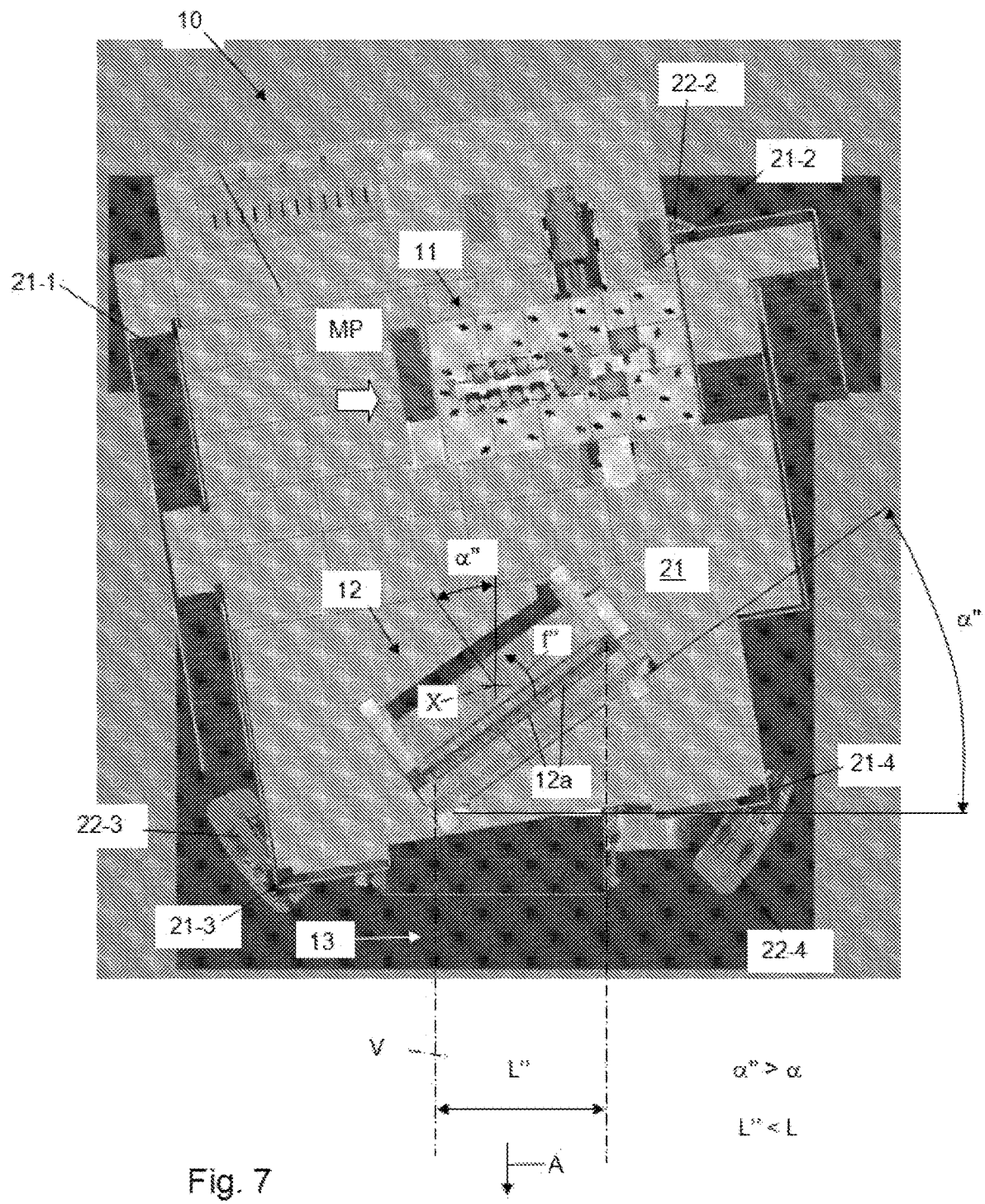
FIG. 7 is a graphic view, in an enlarged scale, showing in plan the plant of FIGS. 6 and 6A in the third inclined arrangement.
Figure 7A:
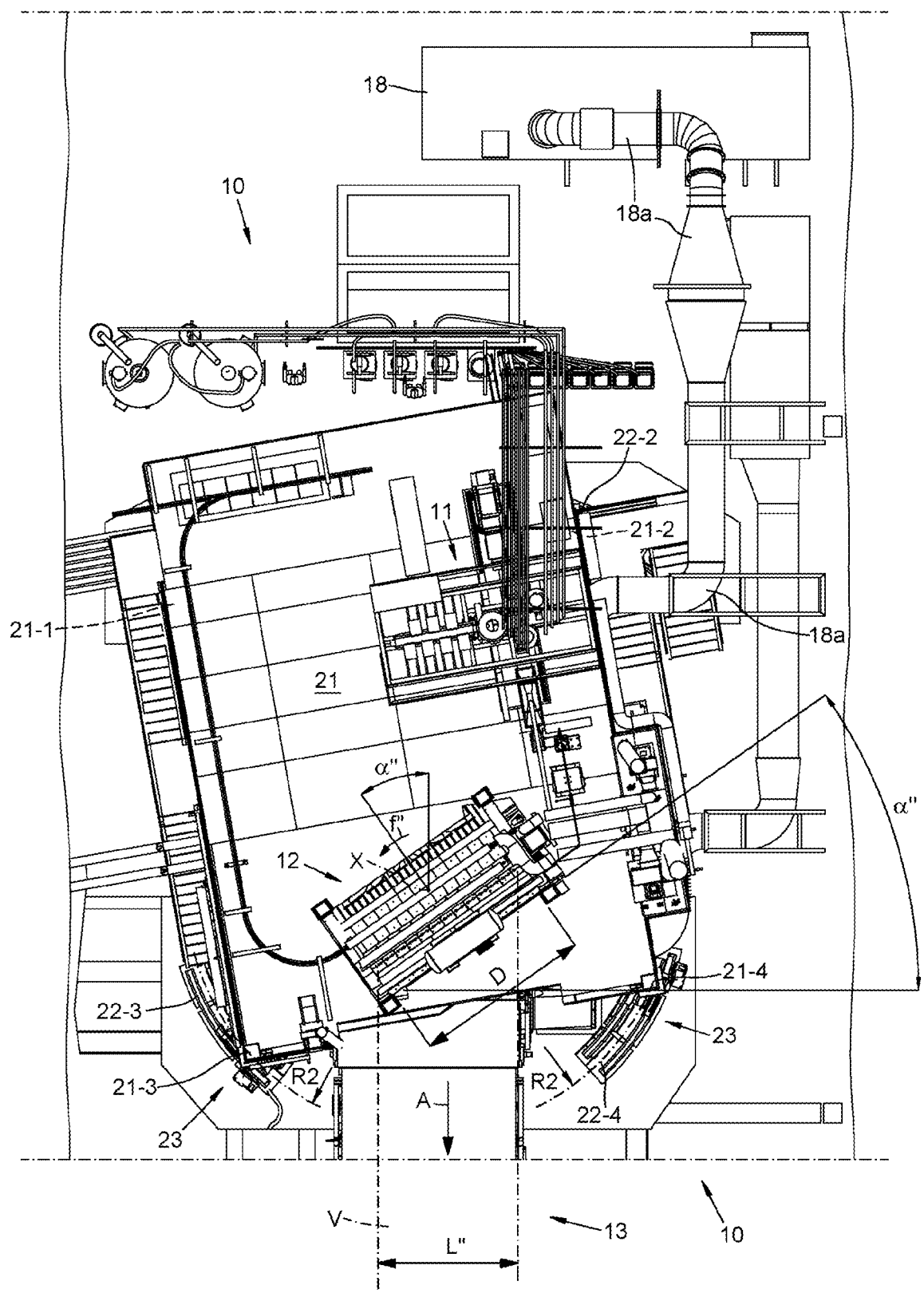
FIG. 7A is a view, only of lines, corresponding to the plan view of FIG. 7.

Furthermore FIGS. 6 and 7 show the plant 10 in a second inclined position, i.e. with the platform 21 still inclined and therefore misaligned with respect to the direction of advancement A of the conveyor belt 13, wherein this second inclined position of the plant 10 is obtained by rotating the base platform 21 anti-clockwise around the respective vertical rotation axis X, as indicated by an arrow f" in FIG. 7, starting from the respective standard nominal configuration.

For example, in this second inclined position, the extrusion bar 12 is inclined according to an angle α of 35° with respect to the direction of advancement A of the conveyor belt 13, so that this second inclined position, which corresponds to a minimum width L" of the non-woven web V produced by the plant 10, is obtained by rotating the base platform 21 by 10° in an anti-clockwise direction around the vertical rotation axis X, starting from the respective standard nominal configuration.

Therefore, in the example described above, the range of variation of the inclination α of the extrusion bar 12 with respect to the direction of advancement A of the conveyor belt 13 is between 20° and 35°, therefore with a total excursion of 15°, so that the width L of the non-woven web V varies from a maximum value L' corresponding to the inclination of 20° to a minimum value L" corresponding to the inclination of 35° of the extrusion bar 12 with respect to the advancement direction A of the conveyor belt 13.

An angular variation range of 15°, such as that described above, of the extrusion bar 12 with respect to the direction of advancement A of the conveyor belt 13, between an inclination of 35° and one of 20°, with respect to a standard basic inclination 25°, it has proved to be optimal and suitable to cover current industrial and market needs as regards the width of the webs or veils of non-woven fabric that must be produced with the plant 10.

Of course, as already pointed out, different angular variation fields of the inclination of the extrusion bar 12 as well as different arrangements of the same extrusion bar 12 on the base platform 21 are possible, in order to produce non-woven webs of widths designed to meet the market demands for these non-woven webs.

Furthermore, the plant 10 of the invention can comprise a series of further apparatuses, in addition to those already described, which support and serve the production of the non-woven web V, and which, since being well known to those skilled in the art, will only be briefly mentioned and not described in detail.

In particular, the plant 10 can comprise and integrate special apparatuses, typically integrated in the fixed structure of the plant 10, having the function of generating high volumes of technological air provided for various uses during the operation of the same plant 10, for example cooling air for cooling the FF filaments deposited on the conveyor belt 13, or air for pulling and stretching the filaments.

These apparatuses or in general these means for the generation of technological air, included in the plant 10 of the invention, can be connected to the base platform 21, rotatable, by means of suitable bellows, exhibiting a large section, for example of the order of 1 m², for the flow of technological air, wherein these bellows have the function of conveying the technological air from the respective generation means, as said integral with the fixed part or structure of the plant 10, to the equipments installed on the base platform 21, which characterizes the same plant 10 and constitutes its mobile part or structure, and for this purpose they are designed to deform properly so as to adapt their configuration to the rotations and adjustments of the base platform 21 around the vertical axis X to vary the width of the non-woven web V produced by the plant 10.

For example, these bellows may have a configuration that is made, at different diameters, concentrically to the area of the rotation axis X of the base platform 21 with respect to the fixed part of the plant 10.

It is therefore clear, from the description made, that the present invention fully achieves the intended objects, and in particular provides a plant for the production of a non-woven web suitable to meet the market demands for ever greater versatility and efficiency in the production of non-woven webs or veils.

Furthermore, it will be appreciated that the plant of the invention allows to change quickly, without any interruption in production, the width of the non-woven web that is produced, and this of course implies a significant gain in production efficiency.

Furthermore, by appropriately adjusting and varying the inclination of the extrusion bar with respect to the direction of advancement of the conveyor belt, it is possible to considerably reduce production waste that is caused by trimming, along the edges, the non-woven web, produced with the plant, so that its width L conforms to the desired one.

In fact, the plant allows to minimize this waste, limiting it to what is strictly necessary to remove the burrs along the edges of the non-woven web V, so that it exhibits clear and precise edges mutually spaced according to the desired width of the non-woven web.

Instead, in the prior art, since it is not possible to vary the inclination of the extrusion bar, a much greater waste must necessarily be accepted in the operation of trimming the web along its edges so that it has a final width corresponding to the desired one.

Still, unlike the prior art when providing an angularly adjustable continuous filament extrusion bar, the plant of the invention advantageously does not include any rotary joint arranged between the melting station of the polymeric material and the extrusion bar which receives the polymeric material in the molten state to produce the continuous filaments, thanks to the fact that the melting station and the extrusion bar are both solidly and integrally installed on a common angularly adjustable platform.

In this way, the system of the invention avoids any criticality and sealing problem of the molten polymer material that flows at high pressure and temperature in the system.

Variants

It is also clear that both the plant for the production of a non-woven web, the corresponding production process, and the corresponding non-woven web produced with this plant and process, as described above, can be subjected to developments, and/or that further modifications and improvements may be made thereto, without thereby departing from the scope of the present invention.

For example, even if direct reference has been made to spun bonding technology in describing the embodiment 10 of the plant of the invention for the production of the non-woven web, it is clear that the plant of the invention can be advantageously adapted in order to implement the "melt blowing" technology which, as previously illustrated, exhibits many analogies and similarities with the "spun bonding" technology for the production of a non-woven web.

Again, according to further variants, both the rotation system as a whole of the base platform 21 around the vertical axis X and the respective guide system for this rotation to adjust the inclination of the base platform 21 with respect to the direction of advancement of the conveyor belt 13, and consequently vary the width L of the non-woven web V produced with the plant of the invention, can be made in different ways with respect to what has been previously described.

For example, the rotation system can be based on a central thrust bearing that supports the rotary base platform, as well as exhibit other configurations.

The guide system directed to guide the rotation of the base platform 21 in turn can be of the type including a system for automatically detecting the position of the same base platform, during its rotation, for example as that used, in logistics, by automated shuttles that move following a track embedded in the floor.

Similarly, the bellows which in the plant of the invention convey and supply the technological air to the equipments integral with the rotatable base platform 21, can be made, so as to be capable of deforming and thereby adapting to the rotations and adjustments of the same base platform 21, in any suitable shape and configuration, and therefore exhibit configurations that are also very different from that described above, made at different diameters concentrically to the area of the rotation axis of the base platform 21 with respect to the fixed structure of the plant 10.

It is also clear that the various service apparatuses, included in the plant 10 of the invention, which are used for the production of the non-woven web V, therefore both those described in detail previously and those to which it has been made only a brief mention, such as for example the suction boxes 17 to suck the air in the area of the conveyor belt 13, can be the subject of suitable modifications and variations to adapt to the base platform 21, which characterizes the plant 10 of the invention, and to its capability to rotate and be adjusted around the vertical X axis.

The invention claimed is:

1. A plant for the production of a web of a non-woven, comprising:
   at least one melting station adapted to receive and melt a basic polymeric material;
   an extrusion bar, in turn comprising a plurality of extrusion or drawing nozzles adapted to receive from the melting station the polymeric material in the molten state to produce a plurality of continuous filaments;
   a conveyor belt adapted to advance along an advancing direction and to receive from the above said continuous filaments, produced by said extrusion nozzles, so as to form a web of a non-woven and continuously evacuate it from the plant; and
   consolidation means for consolidating the web of non-woven formed on the conveyor belt;

wherein said extrusion bar is variably inclinable with respect to the advancing direction of the conveyor belt;

wherein the plant further comprises a special structure comprising a rotatable base platform adapted to rotate about a respective axis of rotation with respect to a fixed part or structure of the same plant, and wherein said melting station, adapted to receive and melt the basic polymeric material, and said extrusion bar, in turn comprising said plurality of extrusion or drawing nozzles to receive from the melting station the polymeric material in the molten state, are totally constructed and supported integrally by said rotatable base platform, so as to be rigidly connected to each other without the interposition of any rotary joint, whereby the plant allows to vary the width of the non-woven web produced by the same plant, by rotating and adjusting said base platform around the respective axis of rotation, so as to vary the inclination of said extrusion bar with respect to the advancing direction of the conveyor belt.

2. The plant according to claim 1, wherein said rotatable base platform comprises a plurality of uprights, coupled inferiorly in a sliding manner with respective guide supports, fixed, able to guide the rotary motion of the base platform in order to vary its inclination with respect to the advancing direction of the conveyor belt.

3. The plant according to claim 2, wherein said guide supports, fixed, are made in the form of curved guides on which the uprights rest on the lower side and are able to slide in response to the action of motor means provided for driving the rotation of the platform.

4. The plant according to claim 3, wherein said curved guides able to guide the rotary motion of said base platform are divided into a first pair of curved guides and a second pair of curved guides, wherein each curved guide of the first pair of curved guides has a first radius of curvature, around said vertical axis of rotation, which is greater than a second radius of curvature around said vertical axis of rotation, of each curved guide of the second pair of curved guides.

5. The plant according to claim 1, wherein said plant is adapted to assume with the respective rotatable base platform a standard base configuration in which said extrusion bar, mounted integrally on the rotatable base platform, has a corresponding determined standard inclination with respect to the advancing direction of the conveyor belt and the non-woven web produced by the plant has a corresponding determined standard width, and wherein said plant is adapted to be adjusted, starting from the respective standard base configuration and by rotating said base platform about the respective vertical axis of rotation in a first rotation direction, so as to assume a first inclined configuration in which said extrusion bar has, with respect to the advancing direction of the conveyor belt, a corresponding first inclination lower than said determined standard inclination of the same extrusion bar, whereby, in said first inclined configuration of the plant, the web of non-woven, which is produced, has a width greater than the standard width of the web of non-woven produced when the plant is in the respective standard base configuration; and wherein said system is adapted to be adjusted, starting from the respective standard base configuration and by rotating said base platform about the respective vertical rotation axis in a second rotation direction opposite to said first direction of rotation, so as to assume a second inclined configuration in which said extrusion bar has, with respect to the advancing direction of the conveyor belt, a corresponding second inclination higher than said determined standard inclination of the same extrusion bar, whereby, in said second inclined configuration of the plant, the web of non-woven, which is produced, has a width lower than the standard width of the web of non-woven produced when the plant is in the respective standard base configuration.

6. The plant according to claim 5, wherein in the respective standard base configuration corresponding to the standard width of the non-woven web produced by the same plant, the extrusion bar has an inclination of about 25° with respect to the advancing direction of the conveyor belt;

wherein in the first inclined configuration of the plant, corresponding to a maximum width of the non-woven web produced by the same implant, the extrusion bar has an inclination of about 20° with respect to the advancing direction of the conveyor belt; and wherein in the second inclined configuration of the plant, corresponding to a minimum width of the non-woven web produced by the same plant, the extrusion bar has an inclination of about 35° with respect to the advancing direction of the conveyor belt, whereby the angular variation range of the inclination of the extrusion bar with respect to the advancing direction of the conveyor belt, to produce by the plant non-woven webs of widths between a maximum value and a minimum value, is about 15°.

7. The plant according to claim 1, wherein said rotation axis extends vertically in a central and barycentric area of said extrusion bar.

8. The plant according to claim 1, further comprising technological air generation means, integral with the fixed part or structure of the plant, to generate high volumes of technological air during operation of the plant, wherein said means for generating technological air are connected to said base platform, rotatable, by means of bellows suitable for conveying the technological air from the respective generating means, integral with the part or fixed structure of the plant, to the equipments which are installed on the rotatable base platform and thereby are included in the mobile part or structure of the same plant, wherein said bellows are adapted to suitably deform themselves so as to adapt their configuration to the rotations and to the adjustments of the rotatable base platform about the vertical axis to vary the width of the non-woven web produced by the plant, and wherein, in particular, said bellows have a configuration which is carried out at different diameters concentrically to the area of the vertical rotation axis of the rotatable base platform with respect to the fixed part of the plant.

9. A process for the production by spun bonding or a similar technology of a web of a non-woven, comprising the following steps:

installing a plant, according to claim 1, for the production of a non-woven web; and varying the width of the non-woven web produced by said plant, rotating and adjusting the respective rotatable base platform around the respective vertical rotation axis, so as to vary the inclination of the extrusion bar with respect to the advancing direction of the conveyor belt of the same plant.

* * * * *